US010739240B2

(12) United States Patent
Kawano

(10) Patent No.: US 10,739,240 B2
(45) Date of Patent: Aug. 11, 2020

(54) PARTICLE ANALYZER

(71) Applicant: KAWANO Lab. Inc., Osaka (JP)

(72) Inventor: Makoto Kawano, Ikeda (JP)

(73) Assignee: KAWANO Lab. Inc., Osaka (JP)

(*) Notice: Subject to any disclaimer, the term of this patent is extended or adjusted under 35 U.S.C. 154(b) by 89 days.

(21) Appl. No.: 15/769,863

(22) PCT Filed: Oct. 21, 2016

(86) PCT No.: PCT/JP2016/081321
§ 371 (c)(1),
(2) Date: Apr. 20, 2018

(87) PCT Pub. No.: WO2017/069260
PCT Pub. Date: Apr. 27, 2017

(65) Prior Publication Data
US 2018/0313738 A1 Nov. 1, 2018

(30) Foreign Application Priority Data

Oct. 23, 2015 (JP) ................. 2015-209193

(51) Int. Cl.
G01N 15/02 (2006.01)
G01N 9/00 (2006.01)
(Continued)

(52) U.S. Cl.
CPC ........... *G01N 15/0211* (2013.01); *G01N 9/00* (2013.01); *G01N 15/0227* (2013.01);
(Continued)

(58) Field of Classification Search
CPC .. G01N 15/0211; G01N 9/00; G01N 15/1031; G01N 15/1468; G01N 15/1456;
(Continued)

(56) References Cited

U.S. PATENT DOCUMENTS 6,881,314 B1 * 4/2005 Wang ................... B01D 21/283
204/450
7,288,412 B2 10/2007 Nozaki et al.
(Continued)

FOREIGN PATENT DOCUMENTS

JP S61-277047 A 12/1986
JP H03-056842 A 3/1991
(Continued)

OTHER PUBLICATIONS

International Search Report issued in PCT/JP2016/081321; dated Jan. 24, 2017.

*Primary Examiner* — Rebecca C Bryant
(74) *Attorney, Agent, or Firm* — Studebaker & Brackett PC

(57) ABSTRACT

A particle analyzer (1) includes a measurement cell (2) and a measurement section (10). The particle analyzer (1) further includes a migration section. The migration section includes magnets (3a and 3b), electrodes (4a, 4b, and 4c), a power source (5), and a laser light source (6). The migration section causes migration of particles contained in a medium loaded into the measurement cell (2) by at least two of a magnetophoresis method, a dielectrophoresis method, an electromagnetophoresis method, and a photophoresis method. The measurement section (10) performs determination of a physical quantity of the particles and determination of a migration rate of the particles.

24 Claims, 19 Drawing Sheets

(51) Int. Cl.
  *G01N 15/10* (2006.01)
  *G01N 15/14* (2006.01)
  *G01N 27/72* (2006.01)
  *G01N 15/00* (2006.01)

(52) U.S. Cl.
  CPC ..... *G01N 15/1031* (2013.01); *G01N 15/1456* (2013.01); *G01N 15/1468* (2013.01); *G01N 27/72* (2013.01); *G01N 2015/03* (2013.01)

(58) Field of Classification Search
  CPC . G01N 15/0227; G01N 27/72; G01N 2015/03
  See application file for complete search history.

(56) References Cited

U.S. PATENT DOCUMENTS

| | | | |
|---|---|---|---|
| 8,625,093 | B2 | 1/2014 | Yamaguchi et al. |
| 2002/0182627 | A1* | 12/2002 | Wang ................ B01L 3/502761 435/6.11 |
| 2004/0050756 | A1* | 3/2004 | Flagan ............... B01D 21/0009 209/156 |
| 2004/0121474 | A1* | 6/2004 | SooHoo ............... G01N 33/505 436/63 |
| 2005/0026241 | A1 | 2/2005 | Nozaki et al. |
| 2006/0210129 | A1 | 9/2006 | Trendelenburg et al. |
| 2008/0026452 | A1 | 1/2008 | Nozaki et al. |
| 2011/0181869 | A1 | 7/2011 | Yamaguchi et al. |
| 2013/0043132 | A1* | 2/2013 | Liu ........................... B03C 1/32 204/547 |
| 2014/0302490 | A1* | 10/2014 | Medoro ............ B01L 3/502715 435/5 |
| 2018/0313738 | A1* | 11/2018 | Kawano ................. G01N 27/72 |

FOREIGN PATENT DOCUMENTS

| | | |
|---|---|---|
| JP | 2000-105218 A | 4/2000 |
| JP | 2001-242080 A | 9/2001 |
| JP | 2002-071645 A | 3/2002 |
| JP | 2002-357594 A | 12/2002 |
| JP | 2004-264133 A | 9/2004 |
| JP | 2005-049156 A | 2/2005 |
| JP | 2005-534912 A | 11/2005 |
| JP | 2013-088367 A | 5/2013 |
| JP | 2013-253882 A | 12/2013 |
| WO | 2010/035775 A1 | 4/2010 |
| WO | 2013/058084 A1 | 4/2013 |

* cited by examiner

PARTICLE ANALYZER

TECHNICAL FIELD

The present invention relates to particle analyzers.

BACKGROUND ART

Inventors including the present inventor developed a magnetic susceptibility measuring device for measuring magnetic susceptibility (volume susceptibility) of particles on a particle-by-particle basis (see Patent Literature 1).

CITATION LIST

Patent Literature

[Patent Literature 1]
Japanese Patent Application Laid-Open Publication No. 2013-253882

SUMMARY OF INVENTION

Technical Problem

The present inventor has made efforts to develop a device capable of measuring various characteristics of particles using a single system. As a result, the present inventor has reached completion of the present invention. That is, an objective of the present invention is to provide a particle analyzer capable of measuring a plurality of characteristics of particles using a single system.

Solution to Problem

A particle analyzer according to a first aspect of the present invention includes a measurement cell, a migration section, and a measurement section. The measurement cell receives loading of a medium containing particles. The migration section causes migration of the particles in the medium in the measurement cell. The measurement section determines a physical quantity of the particles in the medium in the measurement cell. The measurement section also determines a moving rate of the particles during the migration caused by the migration section. The migration section causes the migration of the particles by at least two of a magnetophoresis method, a dielectrophoresis method, an electromagnetophoresis method, a photophoresis method, and a gravitational sedimentation method.

In an embodiment, the measurement section performs at least two of: determination of a magnetic susceptibility of the particles based on the moving rate of the particles during the migration by magnetophoresis; determination of a permittivity of the particles based on the moving rate of the particles during the migration by dielectrophoresis; determination of an electrical conductivity of the particles based on the moving rate of the particles during the migration by electromagnetophoresis; determination of a refractive index of the particles based on the moving rate of the particles during the migration by photophoresis; and determination of a specific gravity or a mass of the particles based on the moving rate of the particles during the migration by gravitational sedimentation.

A particle analyzer according to a second aspect of the present invention includes a measurement cell, a migration section, and a measurement section. The measurement cell receives loading of a medium containing particles. The migration section causes migration of the particles in the medium in the measurement cell. The measurement section determines a physical quantity of the particles in the medium in the measurement cell. The measurement section also determines a moving rate of the particles during the migration caused by the migration section. The migration section causes the migration of the particles by at least two of a dielectrophoresis method, an electromagnetophoresis method, a photophoresis method, a gravitational sedimentation method, and an electrophoresis method.

In an embodiment, the measurement section performs at least two of: determination of a permittivity of the particles based on the moving rate of the particles during the migration by dielectrophoresis; determination of an electrical conductivity of the particles based on the moving rate of the particles during the migration by electromagnetophoresis; determination of a refractive index of the particles based on the moving rate of the particles during the migration by photophoresis; determination of a specific gravity or a mass of the particles based on the moving rate of the particles during the migration by gravitational sedimentation; and determination of a zeta potential of the particles based on the moving rate of the particles during the migration by electrophoresis.

A particle analyzer according to a third aspect of the present invention includes a measurement cell, a migration section, and a measurement section. The measurement cell receives loading of a medium containing particles. The migration section causes migration of the particles in the medium in the measurement cell. The measurement section determines a physical quantity of the particles in the medium in the measurement cell. The measurement section also determines a moving rate of the particles during the migration caused by the migration section. The migration section causes the migration of the particles by a magnetophoresis method, an electrophoresis method, and at least one of a dielectrophoresis method, an electromagnetophoresis method, a photophoresis method, and a gravitational sedimentation method.

In an embodiment, the measurement section performs at least one of: determination of a permittivity of the particles based on the moving rate of the particles during the migration by dielectrophoresis; determination of an electrical conductivity of the particles based on the moving rate of the particles during the migration by electromagnetophoresis; determination of a refractive index of the particles based on the moving rate of the particles during the migration by photophoresis; and determination of a specific gravity or a mass of the particles based on the moving rate of the particles during the migration by gravitational sedimentation. The measurement section also performs determination of a magnetic susceptibility of the particles based on the moving rate of the particles during the migration by magnetophoresis. The measurement section also performs determination of a zeta potential of the particles based on the moving rate of the particles during the migration by electrophoresis In an embodiment, the measurement section further performs determination of at least one of a particle size and a molecular weight of the particles based on a static light scattering method.

In an embodiment, the particle analyzer further includes a light source and a light-detecting element.

In an embodiment, the light source generates light to be irradiated onto the particles in the medium in the measurement cell. The light-detecting element detects light from the particles irradiated with the light.

In an embodiment, the measurement section obtains at least one of an absorption spectrum, an emission spectrum, and a scattering spectrum corresponding to wavelengths of the light irradiated onto the particles based on an output of the light-detecting element.

In an embodiment, the measurement section determines, as a physical quantity of the particles, a particle size or a particle size distribution of the particles based on at least one of an imaging method, a Brownian motion observation method, a dynamic light scattering method, a static light scattering method, a laser diffraction method, an ultrasound method, and a spectrophotometric spectral analysis method.

In an embodiment, the measurement section determines the moving rate of the particles based on at least one of a particle tracking method, a scattered light frequency shift analysis method, an ultrasound frequency shift analysis method, a heterodyne method, and a point to point traveling time analysis method.

In an embodiment, the particle analyzer further includes a display section.

In an embodiment, the display section displays a screen image showing at least one physical quantity determined by the measurement section.

In an embodiment, the display section displays a screen image showing a relationship between at least two physical quantities determined by the measurement section.

In an embodiment, the display section displays a screen image having a layout that allows comparison of at least two physical quantities determined by the measurement section.

In an embodiment, the display section displays a screen image including a graph showing a relationship between at least two physical quantities determined by the measurement section.

In an embodiment, the display section displays a screen image including a two-dimensional graph showing a relationship between two physical quantities determined by the measurement section.

In an embodiment, the display section displays a screen image including a three-dimensional graph showing a relationship between three physical quantities determined by the measurement section.

In an embodiment, the particle analyzer further includes an imaging section configured to image the particles.

In an embodiment, the display section displays a screen image including the particles imaged by the imaging section.

In an embodiment, the display section displays a screen image including the imaged particles and a screen image that shows at least one physical quantity determined by the measurement section and that is superimposed on the imaged particles.

In an embodiment, the display section displays a screen image including the imaged particles in which imaged particles having a specific physical quantity that is equal to or greater than a threshold value are shown in a color, and imaged particles having the specific physical quantity that is smaller than the threshold value are shown in a different color.

In an embodiment, the particle analyzer further includes an exterior that covers the measurement cell.

In an embodiment, the exterior includes a substance having a smaller refractive index than the measurement cell.

Advantageous Effects of Invention

Through the present invention, a plurality of characteristics of particles can be measured using a single system.

DESCRIPTION OF EMBODIMENTS

Overview of Particle Analyzer

Figure 1:
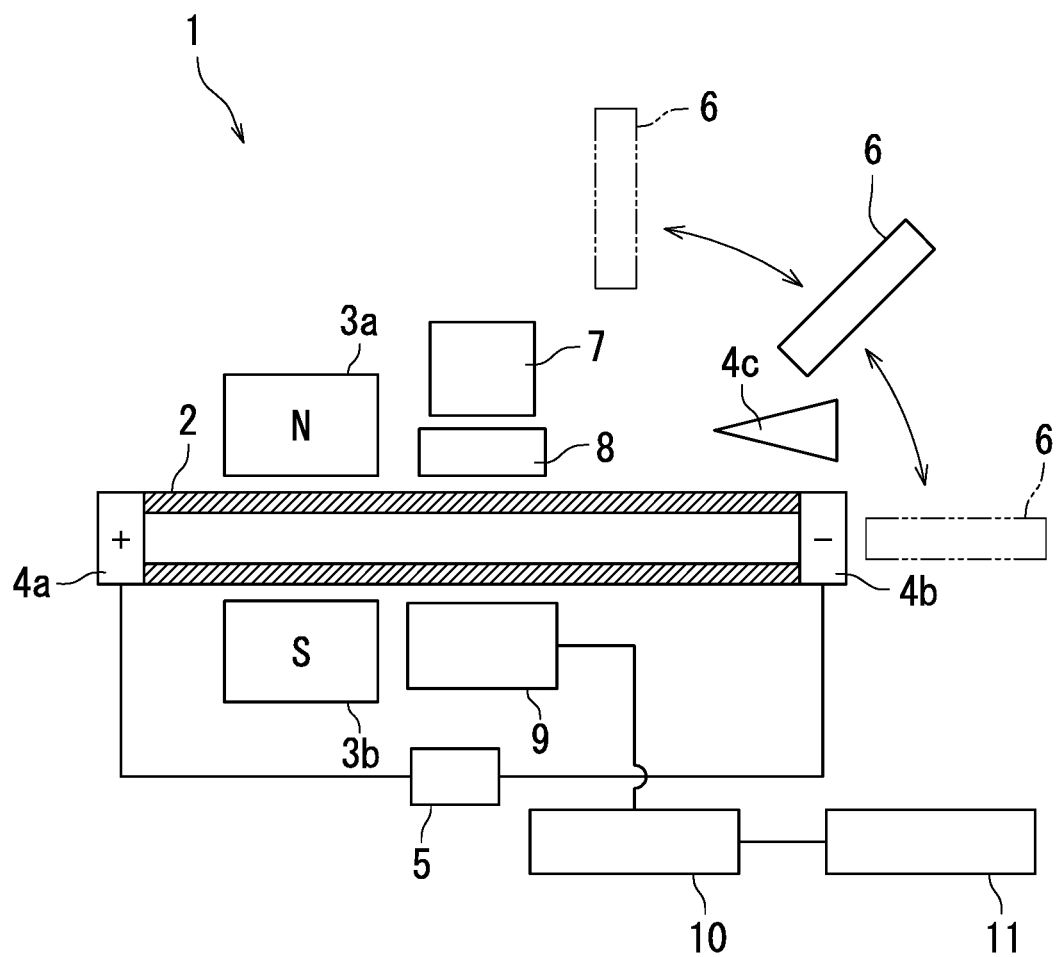
FIG. 1 is a diagram illustrating a partial configuration of a particle analyzer according to a first embodiment of the present invention.

First, overview (measurement principles) of a particle analyzer according to an embodiment of the present invention will be described.

Particles undergo an influence of an externally applied external field. More specifically, particles migrate at a migration rate depending on force resulting from the external field. The magnitude of the force resulting from the external field depends on a physical quantity of particles in response to the external field. The migration rate is therefore a rate depending on the physical quantity of the particles in response to the external field. Accordingly, the physical quantity of the particles in response to the external field can be determined based on the migration rate.

Magnetophoresis Method

In a case where a magnetic field is applied as an external field, particles magnetophoretic ally migrate at a migration rate depending on their magnetic susceptibility (volume susceptibility). Accordingly, the magnetic susceptibility of the particles can be determined based on the migration rate (magnetophoretic velocity) of the magnetophoretically migrating particles. More specifically, the magnetic susceptibility can be determined based on the magnetophoretic velocity and the size of the particles.

Electrophoresis Method

In a case where a homogeneous electric field is applied as an external field, particles electrophoretically migrate at a migration rate depending on their surface charge (zeta potential). Accordingly, the zeta potential of the particles can be determined based on the migration rate (electrophoretic velocity) of the electrophoretically migrating particles.

Dielectrophoresis Method

In a case where an inhomogeneous electric field is applied as an external field, particles dielectrophoretically migrate at a migration rate depending on their permittivity. Accordingly, the permittivity of the particles can be determined based on the migration rate (dielectrophoretic velocity) of the dielectrophoretically migrating particles. More specifically, the permittivity can be determined based on the dielectrophoretic velocity and the size of the particles.

Photophoresis Method

In a case where light (laser light) is applied as an external field, particles photophoretically migrate at a migration rate depending on their refractive index. More specifically, the particles photophoretically migrate because of a refractive index difference between the particles and a medium. Accordingly, the refractive index of the particles can be determined based on the migration rate (photophoretic velocity) of the photophoretically migrating particles. More specifically, the refractive index can be determined based on the photophoretic velocity and the size of the particles.

Electromagnetophoresis Method

In a case where an electromagnetic field is applied as an external field, particles electromagnetophoretically migrate at a migration rate depending on their surface electrical conductance (surface electrical conductivity). Accordingly, the surface electrical conductance of the particles can be determined based on the migration rate (electromagnetophoretic velocity) of the electromagnetophoretically migrating particles. More specifically, the surface electrical conductance can be determined based on the electromagnetophoretic velocity and the size of the particles.

Gravitational Sedimentation Method

Under force resulting from a gravitational field, particles having a large specific gravity precipitate at a migration rate depending on their specific gravity. More specifically, the particles precipitate at a rate depending on a specific gravity difference between the particles and a medium. Accordingly, the specific gravity of the particles can be determined based on a moving rate (migration rate or sedimentation rate) of the particles migrating through gravitational sedimentation (gravitational sedimentation method). Furthermore, the mass of the particles can be determined, providing the volume of the particles is known. It should be noted that the volume of the particles may be calculated using the size of the particles.

Particle Size Determination

The moving rate (migration rate) of particles under an external field may depend on the size of the particles. Accordingly, the size of the particles can be calculated based on the migration rate, providing a physical quantity responsive to the external field is known. More specifically, the magnetophoretic velocity, the dielectrophoretic velocity, the photophoretic velocity, and the electromagnetophoretic velocity are each a rate depending on the size of the particles. Therefore, in a situation in which the magnetic susceptibility of the particles is known, for example, the size of the particles can be calculated using the magnetophoretic velocity.

The particle size and the particle size distribution (particle diameter distribution) can be determined by a method that is different from a method by which the particle size and the particle size distribution are calculated using the migration rate.

For example, the size of each particle can be determined through direct observation of the particle (imaging method). More specifically, the individual particles are observed by bright field microscopy. That is, an image of a medium (for example, a solvent) containing the particles is captured through a microscope with light being uniformly irradiated onto the particles. Thereafter, the size of the individual particles is measured using a general-purpose computer. That is, the captured image is monochromated, and luminance values of points therein are obtained. Next, a derivative of each of the luminance values is compared against a threshold value to determine a boundary of each particle. Next, an area of the particle is detected, and a size of the particle is determined based on a radius of a circle equivalent to the area. Alternatively, a center of the particle is defined, and a plurality of straight lines each passing through the center of the particle are drawn. A distance between two points of intersection of each straight line with the boundary of the particle is obtained. An average of the thus obtained distances is taken to be the size of the particle. The determination of the particle size by the imaging method is preferably performed in a situation in which the particle size is approximately 1 µm or greater.

The particle size distribution can be determined through observation of Brownian motion of the particles (Brownian motion observation method). More specifically, first, the particles in Brownian motion are observed by dark field microscopy. That is, an image of scattered light obtained by irradiating the particles with laser light is captured through a microscope. Alternatively, the particles are fluorescently dyed and observed by dark field microscopy. Thereafter, the particle size distribution is determined using a general-purpose computer. That is, trajectories of the Brownian motion of the particles are obtained from the captured image. Next, diffusion coefficients of the particles are determined based on the trajectories of the Brownian motion. Next, the particle size distribution is determined using the diffusion coefficients. The particle size distribution determination based on the Brownian motion observation method is preferably performed in a situation in which the particle size is less than approximately 1 µm.

Alternatively, the particle size distribution can be determined based on a scattered light absorption spectrum (spectrophotometric spectral analysis method). More specifically, the particles are irradiated with light using a spectrometer (for example, a grating) to detect light scattered from the particles (scattered light). As a light source therefor, a light source that emits natural light (visible light) such as white light can be used. The scattered light can for example be detected using an optical sensor including a photo multiplier tube, a photodiode array, or a charge coupled device (CCD). Thereafter, the particle size distribution is determined using a general-purpose computer. That is, the scattered light absorption spectrum is determined based on a result of the detection of the scattered light (an output of the optical sensor). The absorption spectrum depends on the volume of the particles. Accordingly, the size of each particle can be determined based on a radius of a sphere equivalent to the volume of the particle.

Examples of generally known particle size distribution determination methods include a dynamic light scattering method, a static light scattering method, and a laser diffraction method. The dynamic light scattering method enables particle size distribution determination using intensity fluctuations of the light scattered from the particles (scattered light) depending on the Brownian motion. More specifically, the particles are irradiated with laser light, and the intensity of the scattered light is detected using an optical sensor. Subsequently, the thus obtained intensity of the scattered light is transformed into frequency components through Fourier transform to obtain a power spectrum of the scattered light. Next, the power spectrum of the scattered light is analyzed using an appropriate autocorrelation function to determine the particle size distribution. The static light scattering method involves detection of the intensity of the scattered light at a plurality of points. More specifically, the intensity of rays of the scattered light each having a different scattering angle is detected. Next, angle dependence of the scattered light is analyzed to determine the particle size distribution. The laser diffraction method enables particle size distribution determination through analysis of angle dependence (Rayleigh scattering) of diffracted light depending on the size of the particles.

Molecular Structure Determination

The molecular structure of a component of the particles is identified based on an absorption spectrum, an emission spectrum, or a scattering spectrum for the particles. A wavelength of light to be irradiated onto the particles is selected from among deep ultraviolet to infrared wavelengths. More specifically, an X-ray is used to thereby obtain atoms forming the particles and a bond distance therebetween. Furthermore, the use of light having a wavelength from among far ultraviolet to deep ultraviolet wavelengths (a wavelength of no greater than approximately 200 nm) allows acquisition of information of a structure resulting from a single bond between atoms. Furthermore, the use of light having a wavelength from among ultraviolet to infrared wavelengths allows acquisition of information of a molecular structure resulting from electron transition, nuclear vibration, nuclear rotation, and nuclear translation. In a case where target particles emit light through light absorption, information of a structure corresponding to an emission spectrum can be acquired. The light from the particles can for example be detected using an optical sensor including a photo multiplier tube, a photodiode array, or a CCD.

Molecular Weight Determination

A static light scattering method is generally known as a method for determining the molecular weight of a component of particles.

Based on the above-described various measurement principles, the particle analyzer according to the present embodiment determines, as physical quantities of particles, magnetic susceptibility, zeta potential, permittivity, refractive index, surface electrical conductance (surface electrical conductivity), specific gravity, mass, particle size, and molecular weight using a single system.

The particle analyzer according to the present embodiment determines the particle size or the particle size distribution using any of the imaging method, the Brownian motion observation method, the spectrophotometric spectral analysis method, the dynamic light scattering method, the static light scattering method, and the laser diffraction method. Furthermore, the particle analyzer according to the present embodiment determines the particle size and the particle size distribution for a wide particle size range by combining two or more of the above-mentioned methods.

The particle analyzer according to the present embodiment can calculate magnetic susceptibility, permittivity, refractive index, surface electrical conductance, and mass based on the particle size or the particle size distribution (particle diameter distribution) determined by any of the imaging method, the Brownian motion observation method, the spectrophotometric spectral analysis method, the dynamic light scattering method, the static light scattering method, and the laser diffraction method.

The particle analyzer according to the present embodiment can identify a molecular structure of a component of particles.

First Embodiment

The following describes a particle analyzer 1 according to a first embodiment with reference to the drawings. However, elements that are the same or equivalent are indicated by the same reference signs in the drawings and description thereof is not repeated.

FIG. 1 is a diagram illustrating a partial configuration of the particle analyzer 1 according to the first embodiment. In FIG. 1, a measurement cell 2 is viewed from the side. As illustrated in FIG. 1, the particle analyzer 1 includes the measurement cell 2, magnets 3a and 3b, plate electrodes 4a and 4b, a needle-shaped electrode 4c, a power source 5, a laser light source 6, a white light source 7, a first spectrometer 8, a first optical sensor 9, a measurement section 10, and a display section 11. The particle analyzer 1 illustrated in FIG. 1 is capable of causing migration of particles by the magnetophoresis method, the electrophoresis method, the dielectrophoresis method, the electromagnetophoresis method, and the photophoresis method.

A medium containing measurement target particles is loaded into the measurement cell 2. The measurement cell 2 according to the present embodiment is a glass straight tube. The measurement cell 2 for example has an internal diameter of 5 mm. The measurement cell 2 has an inlet, not illustrated, of the medium. The inlet is closed after loading of the medium. The inlet of the measurement cell 2 is for example connected with a pump via a valve. The valve is closed after the medium is loaded into the measurement cell 2 using the pump.

The magnets 3a and 3b are located opposite to one another with the measurement cell 2 therebetween. The magnets 3a and 3b according to the present embodiment are permanent magnets. The magnet 3a is the north pole and the magnet 3b is the south pole. The magnets 3a and 3b generate a magnetic field to cause magnetophoresis of the particles contained in the medium in the measurement cell 2.

The plate electrodes 4a and 4b are disposed at opposite ends of the measurement cell 2. The plate electrodes 4a and 4b are connected to the power source 5. The power source 5 switchably generates a direct current voltage and a high-frequency voltage. When the power source 5 generates a direct current voltage, the plate electrode 4a serves as a positive electrode and the plate electrode 4b serves as a negative electrode. When the power source 5 generates a direct current voltage, the plate electrodes 4a and 4b generate a homogeneous electric field, causing electrophoresis of the particles contained in the medium in the measurement cell 2.

The plate electrode 4b is replaceable with the needle-shaped electrode 4c. The needle-shaped electrode 4c is used for dielectrophoresis of the particles. That is, the needle-shaped electrode 4c generates an inhomogeneous electric field to cause dielectrophoresis of the particles contained in the medium in the measurement cell 2. In order to generate an inhomogeneous electric field, the power source 5 generates a high-frequency voltage.

When the power source 5 generates a direct current voltage and thus an electric field is generated in the measurement cell 2, an electromagnetic field is generated between the magnet 3a and the magnet 3b. Thus, electro-magnetophoresis of the particles is caused between the magnet 3a and the magnet 3b.

The laser light source 6 emits laser light. The laser light source 6 is movable. In other words, irradiation angle of the laser light is adjustable. The laser light emitted by the laser light source 6 is irradiated onto the particles contained in the medium in the measurement cell 2. The laser light source 6 is used for particle size distribution determination by the Brownian motion observation, particle size distribution determination by the dynamic light scattering method, particle size distribution determination by the static light scattering method, particle size distribution determination by the laser diffraction method, and molecular weight determination by the static light scattering method. Furthermore, the laser light source 6 is used for migration of the particles by the photophoresis method. The laser light source 6 is also used for migration rate measurement.

The white light source 7 emits white light, which is an example of natural light. The white light emitted from the white light source 7 is irradiated onto the particles contained in the medium in the measurement cell 2 through the first spectrometer 8 (for example, a grating). The first optical sensor 9 detects light scattered (scattered light) from the particles irradiated with the white light through the first spectrometer 8. The first optical sensor 9 can for example include a photo multiplier tube, a photodiode array, or a CCD as a light-detecting element. The white light source 7, the first spectrometer 8, and the first optical sensor 9 are used for particle size distribution determination based on the spectrophotometric spectral analysis method.

No particular limitations are placed on a region where the scattered light is detected (scattered light detection region) in the particle size distribution determination based on the spectrophotometric spectral analysis method. Preferably, a region where the particles are not influenced by force resulting from the external field is used as the scattered light detection region. By using a region where the particles are not influenced by force resulting from the external field as the scattered light detection region, fluctuations of a scattered light absorption spectrum due to Brownian motion of the particles are accurately captured. Since the magnets 3a and 3b according to the present embodiment are permanent magnets, it is preferable to use a region where the particles are not influenced by the magnetic field generated by the magnets 3a and 3b as the scattered light detection region. Preferably, the first optical sensor 9 detects the scattered light while the power source 5 is not generating a voltage. In other words, the first optical sensor 9 preferably detects the scattered light while no electric field is generated in the measurement cell 2. No laser light is allowed to enter the scattered light detection region during the detection of the scattered light by the first optical sensor 9. For example, emission of the laser light by the laser light source 6 is stopped.

The measurement section 10 is for example a general-purpose computer. The measurement section 10 determines physical quantities of the particles contained in the medium in the measurement cell 2. More specifically, the measurement section 10 determines magnetic susceptibility, zeta potential, permittivity, refractive index, surface electrical conductance (surface electrical conductivity), particle size, particle size distribution, and molecular weight. In a situation in which a physical quantity responsive to the external field is known, for example, the measurement section 10 calculates a particle size based on the migration rate. The measurement section 10 obtains a scattered light absorption spectrum based on an output of the first optical sensor 9 and determines the particle size distribution based on change in the absorption spectrum (spectrophotometric spectral analysis method). The measurement section 10 also determines the particle size distribution and the molecular weight based on the static light scattering method.

Furthermore, the measurement section 10 determines the moving rate (migration rate) of the particles based on a particle tracking method, a scattered light frequency shift analysis method, a heterodyne method, and a point to point traveling time analysis method. The measurement section 10 also identifies the molecular structure of a component of the particles based on an absorption spectrum, an emission spectrum, or a scattering spectrum for the particles.

The display section 11 is for example a liquid crystal display. The display section 11 displays a screen image showing a physical quantity determined by the measurement section 10. More specifically, the display section 11 can display magnetic susceptibility distribution, zeta potential distribution, permittivity distribution, refractive index distribution, surface electrical conductance distribution, particle size distribution, and molecular weight distribution. The display section 11 also displays a screen image showing a relationship between at least two physical quantities determined by the measurement section 10. The display section 11 can also display a molecular structure identified by the measurement section 10. Screen images to be displayed by the display section 11 are generated by the measurement section 10. A screen image to be displayed by the display section 11 can have a layout that allows comparison of at least two physical quantities determined by the measurement section 10. For example, a screen image to be displayed by the display section 11 can include a graph showing a relationship between at least two physical quantities determined by the measurement section 10. More specifically, a screen image to be displayed by the display section 11 can include a two-dimensional graph showing a relationship between two physical quantities determined by the measurement section 10. Additionally or alternatively, a screen image to be displayed by the display section 11 can include a three-dimensional graph showing a relationship between three physical quantities determined by the measurement section 10.

For example, a screen image to be displayed by the display section 11 can include a graph showing a relationship between the particle size and the migration rate (for example, magnetophoretic velocity), a graph showing a relationship between the square value of the radius of the particles and the migration rate, or the like. Additionally or alternatively, a screen image to be displayed by the display section 11 can include a graph showing a relationship between the particle size and the magnetic susceptibility, a graph showing a relationship between the particle size and the zeta potential, or the like. Additionally or alternatively, a screen image to be displayed by the display section 11 can include a graph showing a relationship between the magnetic susceptibility and the zeta potential, a graph showing a relationship between the magnetic susceptibility and the permittivity, a graph showing a relationship between the zeta potential and the permittivity, or the like. Additionally or alternatively, a screen image to be displayed by the display section 11 can include a graph showing a relationship between the particle size, the magnetic susceptibility, and the zeta potential, a graph showing a relationship between the particle size, the magnetic susceptibility, and the permittivity, or the like. Additionally or alternatively, a screen image to be displayed by the display section 11 can include a graph showing a relationship between the magnetic susceptibility, the zeta potential, and the permittivity, or the like.

Figure 2:
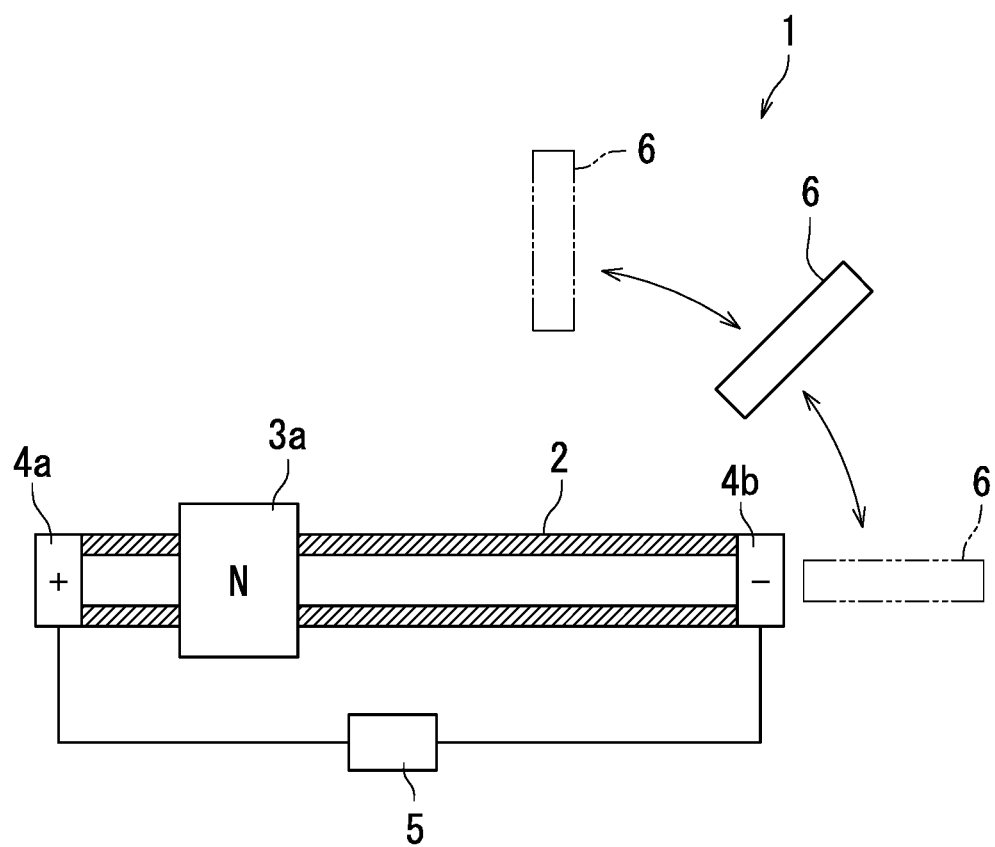
FIG. 2 is a diagram illustrating moving directions of a laser light source according to the first embodiment of the present invention.

FIG. 2 is a diagram illustrating moving directions of the laser light source 6. More specifically, FIG. 2 illustrates the moving directions of the laser light source 6 when the measurement cell 2 is viewed from the top. It should be noted that FIG. 2 illustrates a state of the measurement cell 2 with the plate electrode 4b attached thereto. As illustrated in FIGS. 1 and 2, the laser light source 6 is movable along a spherical surface of a ⅛ sphere. For example, the laser light source 6 is movable along the spherical surface of the ⅛ sphere through a configuration in which the laser light source 6 is supported by a supporting member including a bendable arm section. The moving range of the laser light source 6 is not limited to the spherical surface of the ⅛ sphere. For example, the laser light source 6 is movable along a spherical surface of a ¼ sphere or a spherical surface of a ½ sphere. Alternatively, the laser light source 6 is movable along a substantially spherical surface.

Figure 3:
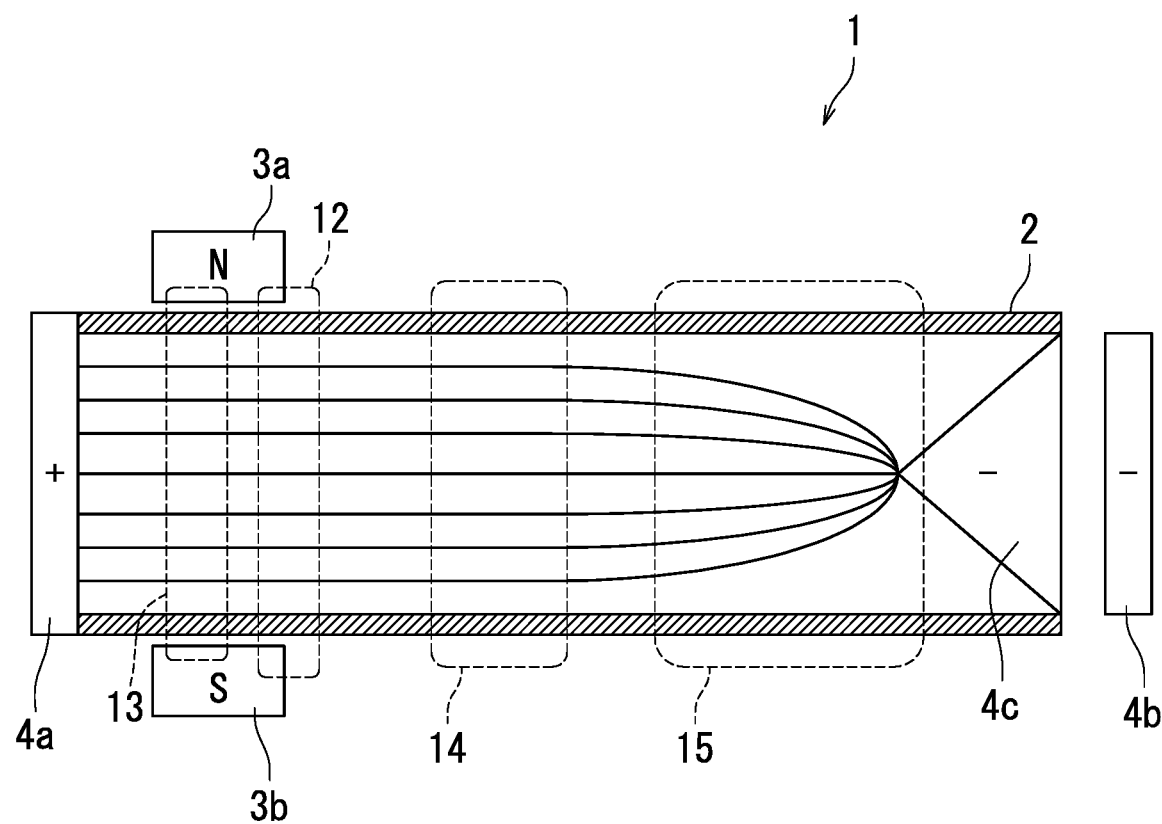
FIG. 3 is a diagram illustrating various migration regions created in a measurement cell according to the first embodiment of the present invention.

FIG. 3 is a diagram illustrating various migration regions created in the measurement cell 2. In other words, FIG. 3 illustrates various external field generation regions. FIG. 3 also illustrates electric field lines generated through the use of the needle-shaped electrode 4c. As illustrated in FIG. 3, it is possible to create a magnetophoresis region 12, an electromagnetophoresis region 13, an electrophoresis region 14, and a dielectrophoresis region 15 in the measurement cell 2.

More specifically, while the power source 5 described with reference to FIG. 1 is generating no voltage, a region near an end of the magnet 3a and an end of the magnet 3b where an inhomogeneous magnetic field is generated (a region where a magnetic field gradient is present) is the magnetophoresis region 12. The particles in the measurement cell 2 magnetophoretically migrate in the magnetophoresis region 12.

When the power source 5 generates a direct current voltage, an inhomogeneous electric field is generated in a region near a pointed end of the needle-shaped electrode 4c and a homogeneous electric field is generated in a region distant from the pointed end of the needle-shaped electrode 4c. The magnet 3a and the magnet 3b are located opposite to one another with the region where the homogeneous electric field is generated. As a result, the homogeneous electric field and a homogeneous magnetic field intersect one another at right angles between the magnet 3a and the magnet 3b. Thus, a homogeneous electromagnetic field is generated between the magnet 3a and the magnet 3b. That is, a region between the magnet 3a and the magnet 3b is the electromagnetophoresis region 13. The particles in the measurement cell 2 electromagnetophoretically migrate in the electromagnetophoresis region 13. It should be noted that the medium is also under electromagnetic force in the region where an electromagnetic field is being generated. As a result, electromagnetic buoyancy acts on the particles in a direction opposite to a direction in which electromagnetic force acts thereon. Accordingly, the electromagnetophoretic velocity is a rate depending on the electromagnetic force and the electromagnetic buoyancy. The electromagnetic force does not act on insulating particles such as polystyrene particles. In the case of such particles, the electromagnetophoretic velocity is a rate depending only on the electromagnetic buoyancy (except influence of the gravitational field).

Of the region where the homogeneous electric field is generated, a region that is not influenced by the magnetic field generated by the magnets 3a and 3b is the electrophoresis region 14. The particles in the measurement cell 2 electrophoretically migrate in the electrophoresis region 14.

For causing dielectrophoresis of the particles in the measurement cell 2, the power source 5 generates a high-frequency voltage. When the power source 5 generates a high-frequency voltage, an inhomogeneous electric field is generated in the region near the pointed end of the needle-shaped electrode 4c as in the case where the power source 5 generates a direct current voltage. In other words, a field gradient is present in the electric field in the region near the pointed end of the needle-shaped electrode 4c. The region where the inhomogeneous electric field is generated is the dielectrophoresis region 15. When the power source 5 generates a direct current voltage, electrophoretic force and dielectrophoretic force act on the particles in the region where the inhomogeneous electric field is generated. In contrast, when the power source 5 generates a high-frequency voltage, electrophoretic force does not act on the particles. In the dielectrophoresis region 15, therefore, the particles dielectrophoretically migrate at a migration rate depending on force resulting from the inhomogeneous electric field (electric field gradient).

In a case where dielectrophoresis of the particles does not need to be caused, a homogeneous electric field may be generated in the measurement cell 2 using the plate electrodes 4a and 4b.

Figure 4:
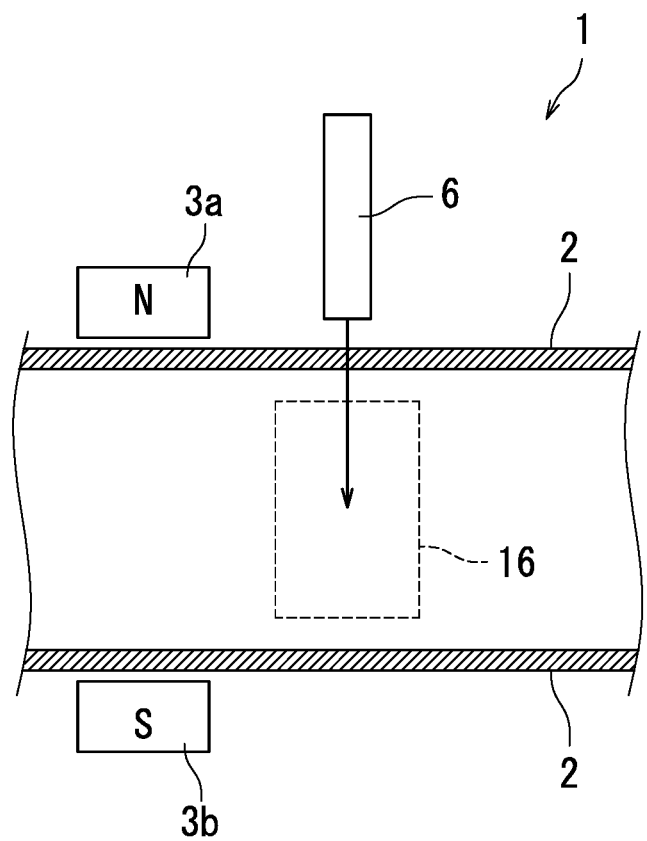
FIG. 4 is a diagram illustrating a photophoresis region created in the measurement cell according to the first embodiment of the present invention.

FIG. 4 is a diagram illustrating a photophoresis region 16 created in the measurement cell 2. As illustrated in FIG. 4, a region to which the laser light source 6 emits laser light is the photophoresis region 16. The particles photophoretically migrate at a migration rate depending on force from the laser light in the photophoresis region 16. FIG. 4 illustrates a position of the laser light source 6 when photophoresis of the particles in a radial direction of the measurement cell 2 is caused.

Figure 5:
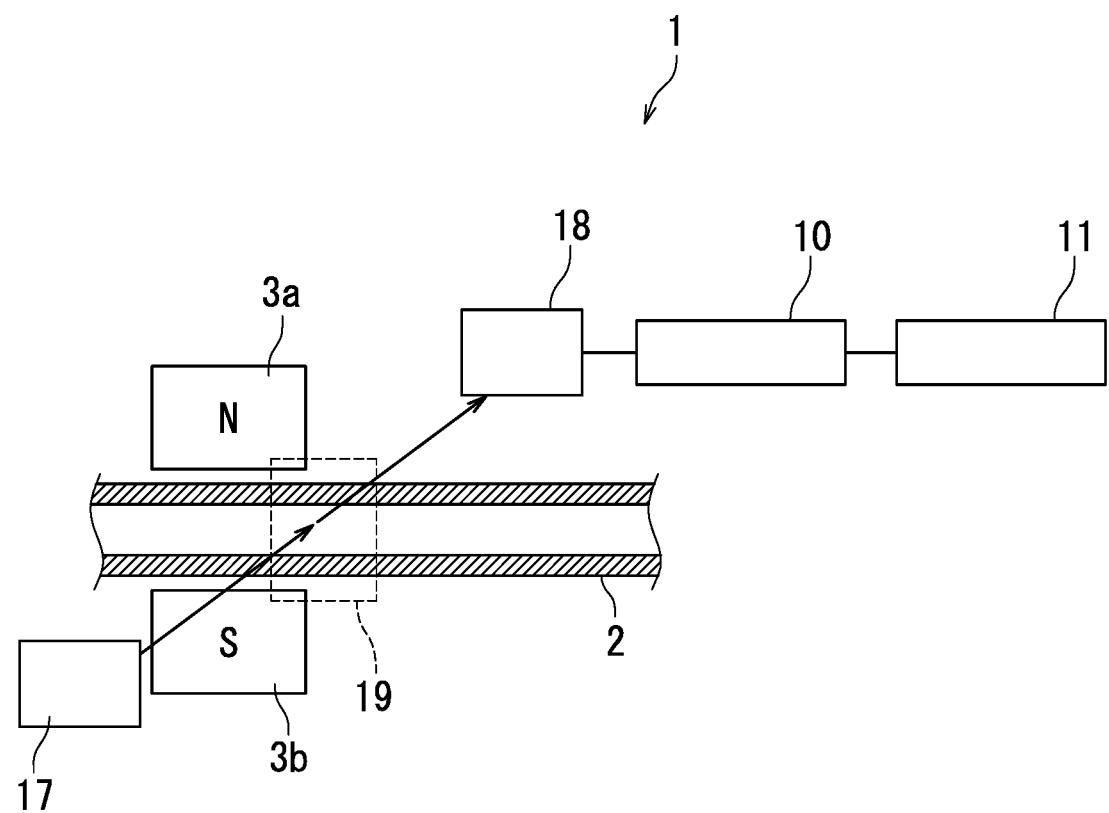
FIG. 5 is a diagram illustrating a configuration for determining a particle size and a migration rate in the first embodiment of the present invention.

FIG. 5 is a diagram illustrating a configuration for determining the particle size and the migration rate. More specifically, FIG. 5 illustrates a configuration for determining the particle size based on the imaging method and determining the migration rate based on the particle tracking method.

As illustrated in FIG. 5, the particle analyzer 1 further includes a first light source 17 and an imaging section 18. The first light source 17 emits light containing a visible light component and having a relatively high intensity. A wavelength spectrum of the light emitted from the first light source 17 may be relatively broad. A halogen lamp may for example be used as the first light source 17.

The imaging section 18 images the light that has been emitted from the first light source 17 and that has passed through the measurement cell 2. The particles can be imaged clearer through the use of the light emitted from the first light source 17 as described above. The measurement section 10 determines the particle size and the migration rate based on a result of the imaging by the imaging section 18.

The imaging section 18 includes a microscope (for example, an electron microscope) and an imaging element. The imaging element may for example be a photo multiplier tube, a CCD, or a photodiode array.

The particle tracking method determines the migration rate by tracking movement of each particle. More specifically, the measurement section 10 obtains the migration rate of each particle from a positional change with time of the particle imaged by the imaging section 18. For example, the imaging section 18 may image the particle at specific time intervals, and the measurement section 10 may obtain the migration rate of the particle from the result of the imaging.

The measurement section 10 also causes the display section 11 to display the particles imaged by the imaging section 18. Additionally or alternatively, the measurement section 10 may cause the display section 11 to display a screen image including the imaged particles and a screen image that shows at least one physical quantity determined by the measurement section 10 and that is superimposed on the imaged particles. Additionally or alternatively, the measurement section 10 may cause the display section 11 to display a screen image including the imaged particles in which imaged particles having a specific physical quantity (for example, magnetic susceptibility) that is equal to or greater than a threshold value are shown in a color, and imaged particles having the specific physical quantity that is smaller than the threshold value are shown in a different color. For example, imaged particles having a magnetic susceptibility of equal to or greater than the threshold value are shown in red, and imaged particles having a magnetic susceptibility of smaller than the threshold value are shown in white. The threshold value is preset in the measurement section 10.

An imaging region 19 of the imaging section 18 is selected from the various migration regions described with reference to FIGS. 3 and 4 depending on the type of migration rate to be obtained. A region to be irradiated with light by the first light source 17 is adjusted according to the imaging region 19. For example, when the magnetophoretic velocity is to be obtained, the imaging region 19 is set to the magnetophoresis region 12 described with reference to FIG. 3.

According to the configuration described with reference to FIG. 5, the particle size and the migration rate can be determined at the same time on a particle-by-particle basis.

Figure 6:
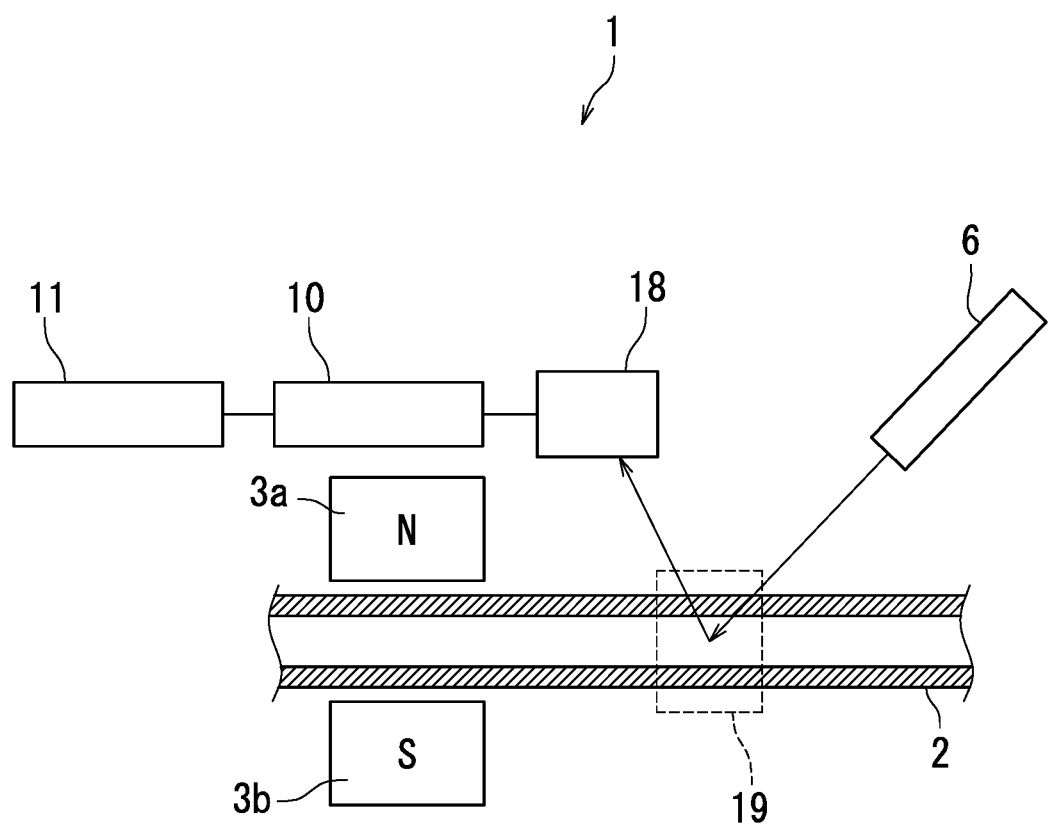
FIG. 6 is a diagram illustrating the particle analyzer according to the first embodiment of the present invention in a state of determining a particle size distribution based on a Brownian motion observation method.

The following describes the Brownian motion observation method with reference to FIG. 6. FIG. 6 illustrates the particle analyzer 1 in a state of determining the particle size distribution based on the Brownian motion observation method. As illustrated in FIG. 6, the laser light source 6 emits laser light to the measurement cell 2 in order to perform Brownian motion observation. The imaging section 18 images light scattered (scattered light) from the particles irradiated with the laser light. The measurement section 10 obtains trajectories of the Brownian motion of the particles from a result of the imaging by the imaging section 18 to determine diffusion coefficients of the particles based on the trajectories of the Brownian motion. Furthermore, the measurement section 10 determines the particle size distribution of the particles using the diffusion coefficients. The measurement section 10 can cause the display section 11 to display an image showing the trajectories of the Brownian motion of the particles.

No particular limitations are placed on the region (imaging region) 19 of imaging by the imaging section 18 in the particle size distribution determination based on the Brownian motion observation method. Preferably, as in the case of the particle size distribution determination based on the spectrophotometric spectral analysis method described with reference to FIG. 1, a region where the particles are not influenced by the magnetic field generated by the magnets 3a and 3b is used as the imaging region 19. Preferably, the imaging section 18 performs imaging while the power source 5 is not generating a voltage.

Figure 7:
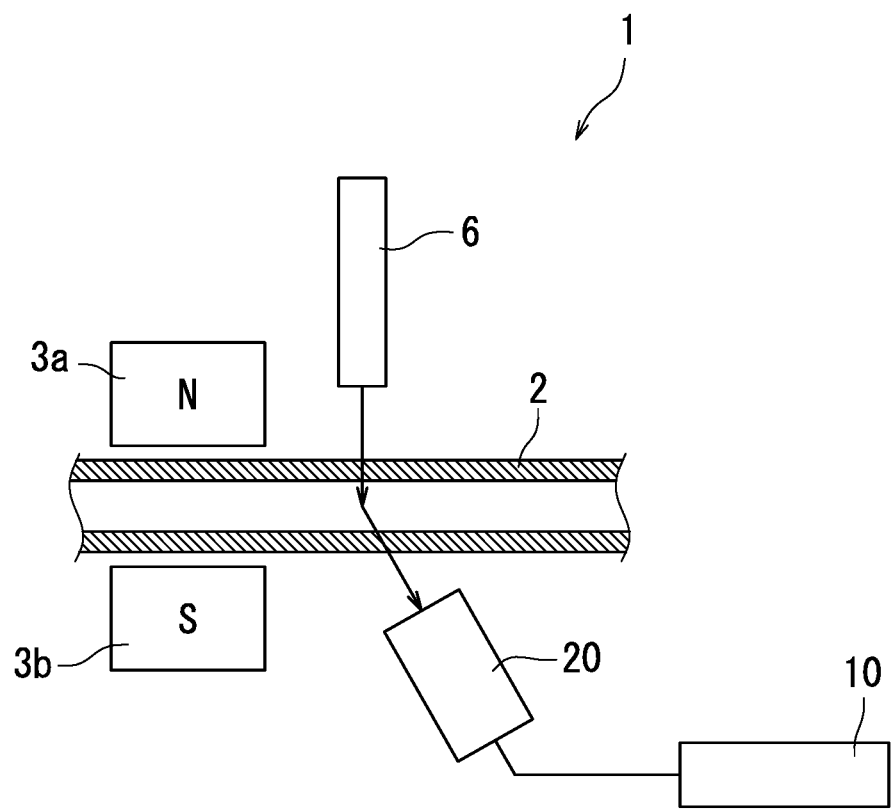
FIG. 7 is a diagram illustrating a configuration for determining a particle size distribution based on a dynamic light scattering method in the first embodiment of the present invention.

The following describes the dynamic light scattering method with reference to FIG. 7. FIG. 7 is a diagram illustrating a configuration for determining the particle size distribution based on the dynamic light scattering method. That is, FIG. 7 illustrates the particle analyzer 1 in a state of determining the particle size distribution based on the dynamic light scattering method. As illustrated in FIG. 7, the particle analyzer 1 includes a second optical sensor 20. The second optical sensor 20 can for example include a photo multiplier tube, a photodiode array, or a CCD as a light-detecting element.

As illustrated in FIG. 7, the laser light source 6 emits laser light to the measurement cell 2 in order to determine the particle size distribution based on the dynamic light scattering method. The second optical sensor 20 detects light scattered (scattered light) from the particles irradiated with the laser light. The measurement section 10 determines the particle size distribution through analysis of intensity fluctuations of the scattered light from an output of the second optical sensor 20. It should be noted that the first optical sensor 9 described with reference to FIG. 1 may be used as the second optical sensor 20.

No particular limitations are placed on a region where the scattered light is detected (scattered light detection region) in the particle size distribution determination based on the dynamic light scattering method. Preferably, as in the case of the particle size distribution determination based on the spectrophotometric spectral analysis method described with reference to FIG. 1, a region where the particles are not influenced by the magnetic field generated by the magnets 3a and 3b is used as the scattered light detection region. Preferably, the scattered light is detected while the power source 5 is not generating a voltage.

The particle size distribution may be determined using a combination of the dynamic light scattering method and the heterodyne method. The use of the combination of the dynamic light scattering method and the heterodyne method allows reduction of noise. As a result, the accuracy of the particle size distribution determination can be increased. It is therefore possible to increase the accuracy of the particle size distribution determination in a situation in which a region where the particles are influenced by force resulting from the external field (for example, the magnetophoresis region 12) is used as the scattered light detection region.

Figure 8:
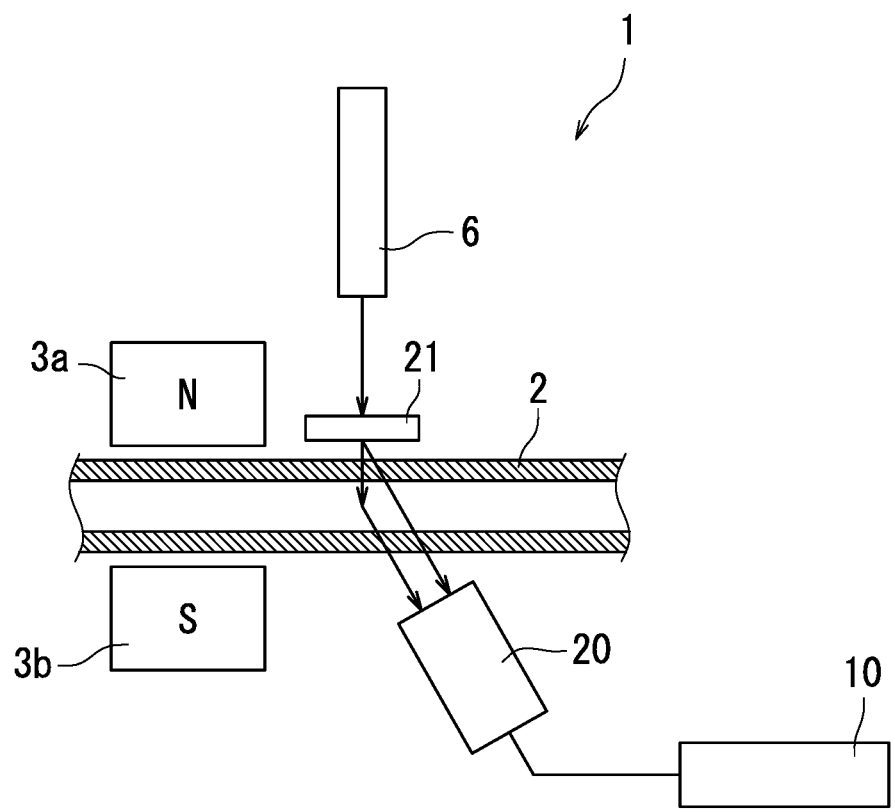
FIG. 8 is a diagram illustrating a configuration for determining a particle size distribution based on a combination of the dynamic light scattering method and a heterodyne method in the first embodiment of the present invention.

FIG. 8 is a diagram illustrating a configuration for determining the particle size distribution based on the combination of the dynamic light scattering method and the heterodyne method. In a configuration in which the particle size distribution is determined using the combination of the dynamic light scattering method and the heterodyne method, the particle analyzer 1 further includes a first grating 21 as illustrated in FIG. 8. The first grating 21 is located between the laser light source 6 and the measurement cell 2. Accordingly, laser light emitted from the laser light source 6 enters the first grating 21.

A portion of the laser light diffracted by the first grating 21 enters the measurement cell 2. The laser light that has entered the measurement cell 2 is irradiated onto the particles and scattered by the particles. The light scattered from the particles (scattered light) enters the second optical sensor 20. Another portion of the laser light diffracted by the first grating 21 directly enters the second optical sensor 20 as reference light without passing through the measurement cell 2. The second optical sensor 20 therefore detects light including the scattered light and the reference light. As a result, an output of the second optical sensor 20 is a signal indicative of the intensity of the light including the scattered light and the reference light. The measurement section 10 determines the particle size distribution through analysis of intensity fluctuations of the light including the scattered light and the reference light using an autocorrelation function.

According to the configuration illustrated in FIG. 8, a portion of the laser light diffracted by the first grating 21 directly enters the second optical sensor 20 as the reference light. Alternatively, the diffracted light (reference light) may enter the second optical sensor 20 after being reflected off at least one piece of mirror. Alternatively, at least one piece of mirror and at least one piece of half mirror are used to match a path of the scattered light with a path of the diffracted light (reference light) upstream of the second optical sensor 20.

According to the configuration illustrated in FIG. 8, the scattered light and the reference light are detected by a single optical sensor (the second optical sensor 20). Alternatively, the scattered light and the reference light may be each detected by a different optical sensor, and outputs of the optical sensors may be merged by the measurement section 10.

According to the configuration illustrated in FIG. 8, the laser light is split using the first grating 21. Alternatively, the laser light may be split using half mirror.

Figure 9:
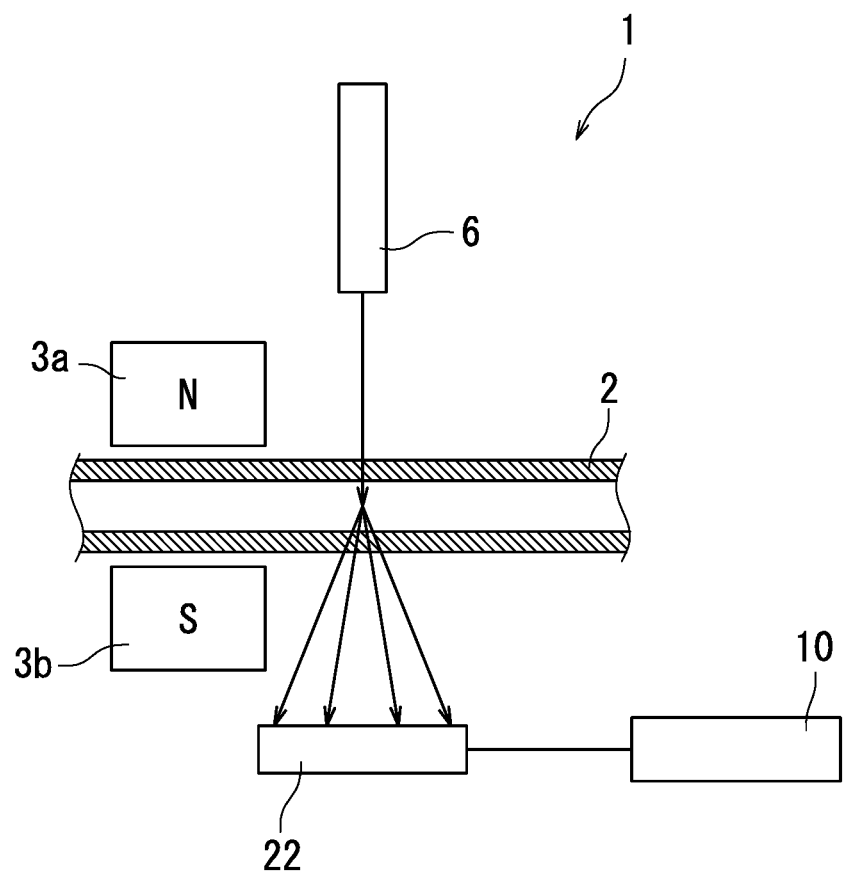
FIG. 9 is a diagram illustrating a configuration for determining a particle size distribution based on a laser diffraction method in the first embodiment of the present invention.

The following describes the laser diffraction method with reference to FIG. 9. FIG. 9 is a diagram illustrating a configuration for determining the particle size distribution based on the laser diffraction method. That is, FIG. 9 illustrates the particle analyzer 1 in a state of determining the particle size distribution based on the laser diffraction method. As illustrated in FIG. 9, the particle analyzer 1 further includes a ring detector 22.

As illustrated in FIG. 9, the laser light source 6 emits laser light to the measurement cell 2 in order to determine the particle size distribution based on the laser diffraction method. The laser light is diffracted by the particles in the measurement cell 2. The ring detector 22 detects the light diffracted by the particles (diffracted light).

The ring detector 22 includes a plurality of light-detecting elements (for example, photodiodes). The ring detector 22 includes ring-shaped or half-ring-shaped detection surfaces each having a different radius. The light-detecting elements are concentrically positioned and each detect light (diffracted light) having a diffraction angle corresponding to the position of the light-detecting element. The ring detector 22 therefore outputs signals indicative of light intensities corresponding to the respective diffraction angles. In other words, the ring detector 22 outputs signals indicative of a spatial light intensity distribution of the diffracted light. The measurement section 10 determines the particle size distribution by performing an operation based on Fraunhofer diffraction theory and Mie scattering theory using the output of the ring detector 22.

No particular limitations are placed on a region to be irradiated with the laser light in the particle size distribution determination based on the laser diffraction method. Preferably, as in the case of the particle size distribution determination based on the spectrophotometric spectral analysis method described with reference to FIG. 1, a region where the particles are not influenced by the magnetic field generated by the magnets 3a and 3b is irradiated with the laser light. Preferably, the diffracted light is detected while the power source 5 is not generating a voltage.

Preferably, a collimated beam is input into the measurement cell 2 in the particle size distribution determination based on the laser diffraction method. Therefore, it is preferable to provide an optical system (optical element) for collimating the laser light emitted from the laser light source 6 between the laser light source 6 and the measurement cell 2.

Figure 10:
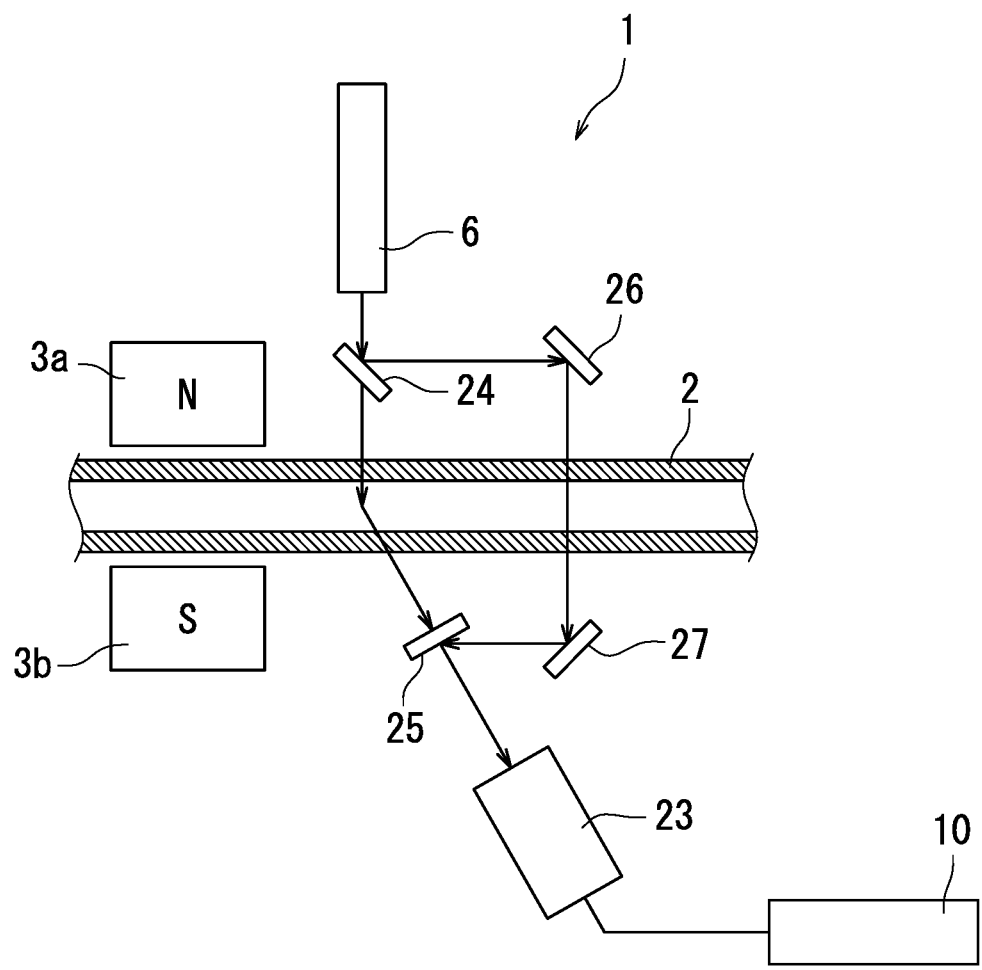
FIG. 10 is a diagram illustrating a configuration for determining a migration rate based on a laser Doppler method in the first embodiment of the present invention.

The following describes the laser Doppler method, which is an example of the scattered light frequency shift analysis method, with reference to FIG. 10. FIG. 10 is a diagram illustrating a configuration for determining the migration rate based on the laser Doppler method. That is, FIG. 10 illustrates the particle analyzer 1 in a state of determining the migration rate based on the laser Doppler method. As illustrated in FIG. 10, the particle analyzer 1 further includes a third optical sensor 23, half mirror 24 and 25, and mirror 26 and 27.

As illustrated in FIG. 10, laser light is emitted from the laser light source 6 in order to determine the migration rate based on the laser Doppler method. A portion of the laser light is irradiated onto the particles migrating in the measurement cell 2 through the half mirror 24. The third optical sensor 23 detects light scattered (scattered light) from the particles irradiated with the laser light through the half mirror 25. Another portion of the laser light is reflected off the half mirror 24 and reaches the half mirror 25 via the mirror 26 and 27 without passing through the measurement cell 2. As a result, the third optical sensor 23 detects the laser light reflected off the half mirror 24. The third optical sensor 23 can for example include a photo multiplier tube, a photodiode array, or a CCD as a light-detecting element.

The measurement section 10 determines the migration rate from an output of the third optical sensor 23. That is, the light scattered (scattered light) from the migrating particles are Doppler-shifted in frequency. A shift amount is proportional to the migration rate. Accordingly, the migration rate can be determined through measurement of the shift amount. The laser light reflected off the half mirror 24 is used as reference light. In other words, the measurement section 10 measures a difference (shift amount) between the frequency of the laser light reflected off the half mirror 24 and the frequency of the scattered light.

It should be noted that the first optical sensor 9 described with reference to FIG. 1 may be used as the third optical sensor 23. Although description is given for a configuration in which two pieces of half mirror 24 and 25 and two pieces of mirror 26 and 27 are used, no particular limitations are placed on the number of pieces of half mirror and the number of pieces of mirror. For example, the half mirror 25 and the mirror 27 may be omitted in a configuration in which the third optical sensor 23 is disposed in a position that allows the light reflected off the mirror 26 and the scattered light can directly enter the third optical sensor 23. The frequency of the laser light emitted from the laser light source 6 may be preset in the measurement section 10 as a reference value of the frequency. In such a configuration, the half mirror 24 and 25 and the mirror 26 and 27 may be omitted. A grating may be provided in place of the half mirror 24. In a configuration in which a grating is provided between the laser light source 6 and the measurement cell 2, the half mirror and the mirror may be omitted so long as the third optical sensor 23 is disposed in a position that allows a portion of light diffracted by the grating and the scattered light to directly enter the third optical sensor 23.

A region in which the migration rate is determined (a region to be irradiated with the laser light) is selected from the various migration regions described with reference to FIG. 3 depending on the type of the migration rate desired to be obtained. For example, for obtaining the magnetophoretic velocity, the laser light is irradiated onto the magnetophoresis region 12 described with reference to FIG. 3.

Figure 11:
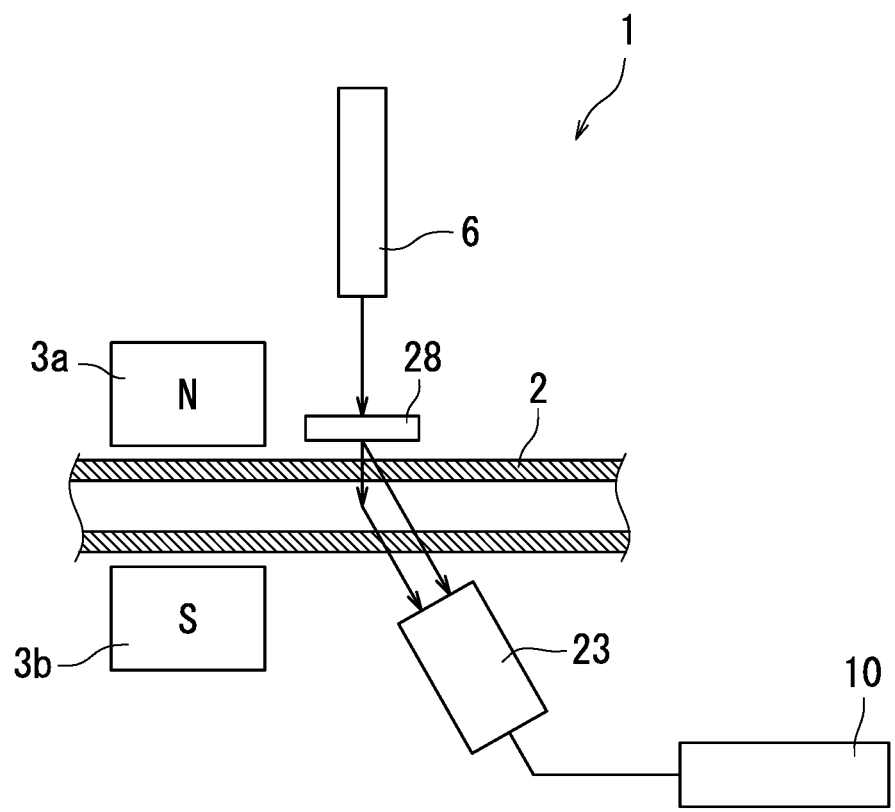
FIG. 11 is a diagram illustrating a configuration for determining a migration rate based on the heterodyne method in the first embodiment of the present invention.

The following describes a configuration for determining the migration rate based on the heterodyne method with reference to FIG. 11. FIG. 11 is a diagram illustrating a configuration for determining the migration rate based on the heterodyne method. That is, FIG. 11 illustrates the particle analyzer 1 in a state of determining the migration rate based on the heterodyne method. More specifically, the particle analyzer 1 determines the migration rate through analysis of scattered light frequency shift in accordance with the heterodyne method.

As illustrated in FIG. 11, the particle analyzer 1 includes a second grating 28. The second grating 28 is located between the laser light source 6 and the measurement cell 2. Laser light is emitted from the laser light source 6 in order to determine the migration rate based on the heterodyne method. The laser light emitted from the laser light source 6 enters the second grating 28.

A portion of the laser light diffracted by the second grating 28 enters the measurement cell 2. The laser light that has entered the measurement cell 2 is irradiated onto the particles and scattered by the particles. The light scattered from the particles (scattered light) enters the third optical sensor 23. Another portion of the laser light diffracted by the second grating 28 directly enters the third optical sensor 23 as reference light without passing through the measurement cell 2. The third optical sensor 23 therefore detects light including the scattered light and the reference light. As a result, an output of the third optical sensor 23 is a signal indicative of the frequency of the light including the scattered light and the reference light. The measurement section 10 determines the migration rate through analysis of frequency shift of the light including the scattered light and the reference light using an autocorrelation function.

A region in which the migration rate is determined (a region to be irradiated with the laser light) is selected from the various migration regions described with reference to FIG. 3 depending on the type of the migration rate desired to be obtained. For example, for obtaining the magnetophoretic velocity, the laser light is irradiated onto the magnetophoresis region 12 described with reference to FIG. 3.

According to the configuration illustrated in FIG. 11, a portion of the laser light diffracted by the second grating 28 is directly input into the third optical sensor 23 as the reference light. Alternatively, the diffracted light (reference light) may be reflected off at least one piece of mirror and thus input into the third optical sensor 23. Alternatively, at least one piece of mirror and at least one piece of half mirror are used to match a path of the scattered light with a path of the diffracted light (reference light) upstream of the third optical sensor 23.

According to the configuration illustrated in FIG. 11, the scattered light and the reference light are detected by a single optical sensor (the third optical sensor 23). Alternatively, the scattered light and the reference light may be each detected by a different optical sensor, and outputs of the optical sensors may be merged by the measurement section 10.

According to the configuration illustrated in FIG. 11, the laser light is split using the second grating 28. Alternatively, the laser light may be split using half mirror.

The first grating 21 described with reference to FIG. 8 may be used as the second grating 28.

Figure 12:
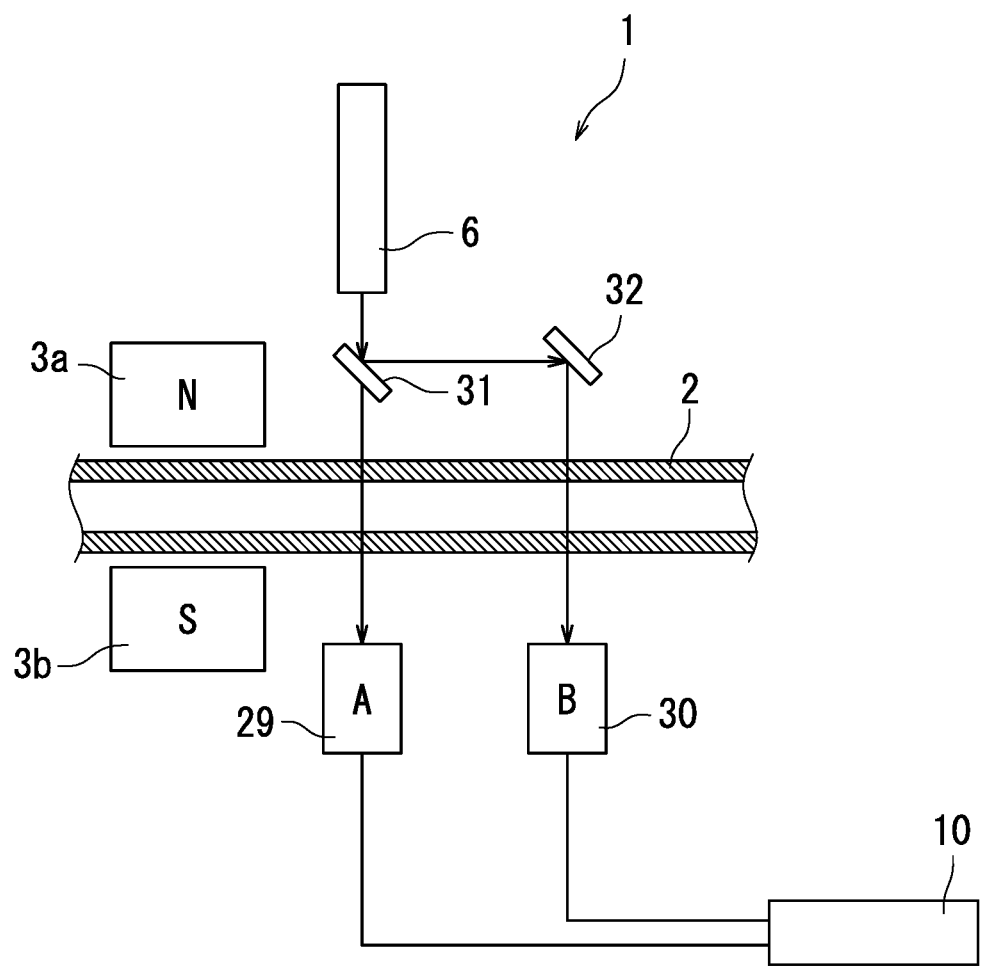
FIG. 12 is a diagram illustrating a configuration for determining a migration rate based on a point to point traveling time analysis method in the first embodiment of the present invention.
Figure 13:
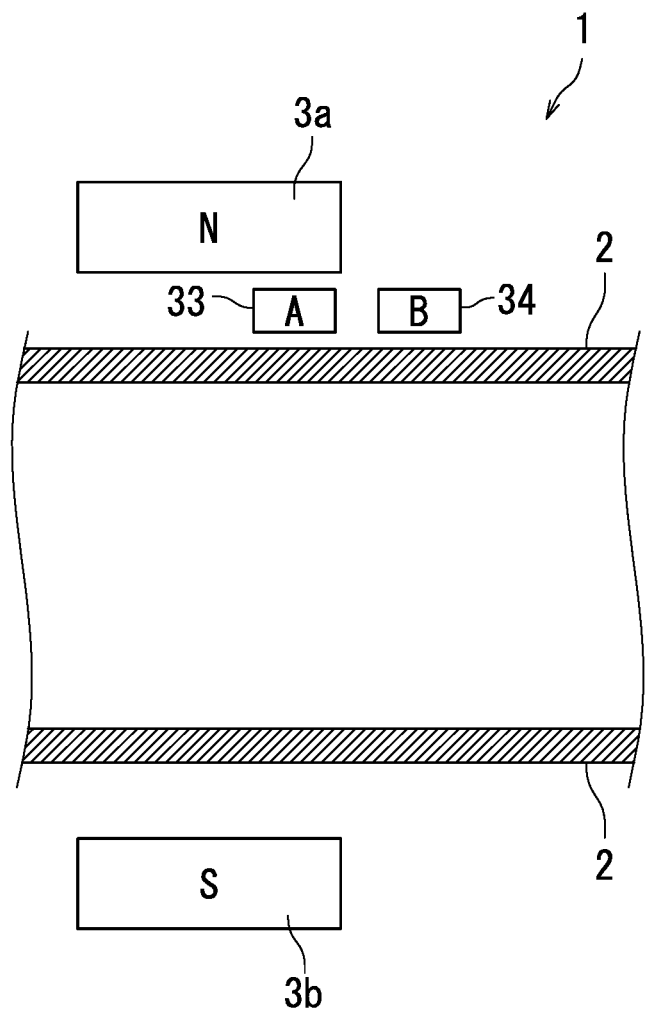
FIG. 13 is a diagram illustrating a configuration for determining a magnetophoretic velocity based on the point to point traveling time analysis method in the first embodiment of the present invention.

The following describes the point to point traveling time analysis method with reference to FIGS. 12 and 13. According to the point to point traveling time analysis method, the migration rate is determined through analysis of time taken by the particles to travel (migrate) a specific distance (a distance from a point to a point). A highly homogeneous sample is for example suitably used in the point to point traveling time analysis method.

FIG. 12 is a diagram illustrating a configuration for determining the migration rate based on the point to point traveling time analysis method. According to the configuration illustrated in FIG. 12, laser light is irradiated onto two specific points (point A and point B) in the measurement cell 2 in order to determine the migration rate.

As illustrated in FIG. 12, the particle analyzer 1 includes a fourth optical sensor 29, a fifth optical sensor 30, half mirror 31, and mirror 32. The laser light is emitted from the laser light source 6 in order to determine the migration rate. A portion of the laser light passes through the point A in the measurement cell 2 through the half mirror 31. The fourth optical sensor 29 detects the laser light passing through the point A. Another portion of the laser light is reflected off the half mirror 31 and passes through the point B in the measurement cell 2 via the mirror 32. The fifth optical sensor 30 detects the laser light passing through the point B. The fourth optical sensor 29 and the fifth optical sensor 30 can for example each include a photo multiplier tube, a photodiode array, or a CCD as a light-detecting element.

The particles migrating under force of the external field pass through the point A, and in response an output of the fourth optical sensor 29 changes. The measurement section 10 detects the particles passing through the point A from the change in the output of the fourth optical sensor 29. Thereafter, the particles pass through the point B, and in response an output of the fifth optical sensor 30 changes. The measurement section 10 detects the particles passing through the point B from the change in the output of the fifth optical sensor 30. The measurement section 10 measures time taken by the particles to travel from the point A to the point B (hereinafter, referred to as point to point traveling time) based on the output of the fourth optical sensor 29 and the output of the fifth optical sensor 30. Furthermore, the measurement section 10 calculates the migration rate of the particles based on the point to point traveling time and the distance from the point A to the point B (specific distance).

A region in which the migration rate is determined (a region to be irradiated with the laser light) is selected from the various migration regions described with reference to FIG. 3 depending on the type of the migration rate desired to be obtained. For example, for obtaining the magnetophoretic velocity, the laser light is irradiated onto the magnetophoresis region 12 described with reference to FIG. 3.

Although description is given for a configuration in which a single laser light source 6 is used to irradiate the laser light onto the point A and the point B, another configuration may be employed in which two laser light sources respectively corresponding to the point A and the point B are used.

FIG. 13 is a diagram illustrating a configuration for determining the magnetophoretic velocity based on the point to point traveling time analysis method. According to the configuration illustrated in FIG. 13, two magnetic sensors (a first magnetic sensor 33 and a second magnetic sensor 34) respectively corresponding to the two specific points (the point A and the point B) in the measurement cell 2 are used in order to determine the magnetophoretic velocity.

As illustrated in FIG. 13, the particle analyzer 1 includes the first magnetic sensor 33 and the second magnetic sensor 34. Sensors each including a magnetoresistance effect element may for example be used as the first magnetic sensor 33 and the second magnetic sensor 34. The first magnetic sensor 33 is disposed corresponding to the point A in the measurement cell 2. The second magnetic sensor 34 is disposed corresponding to the point B in the measurement cell 2. The points A and B are established within the magnetophoresis region 12 described with reference to FIG. 3.

The magnetophoretically migrating particles pass through the point A, and in response an output of the first magnetic sensor 33 changes. The measurement section 10 detects the particles passing through the point A from the change in the output of the first magnetic sensor 33. Thereafter, the particles pass through the point B, and in response an output of the second magnetic sensor 34 changes. The measurement section 10 detects the particles passing through the point B from the change in the output of the second magnetic sensor 34. The measurement section 10 determines the point to point traveling time from the output of the first magnetic sensor 33 and the output of the second magnetic sensor 34. Furthermore, the measurement section 10 calculates the migration rate of the particles based on the point to point traveling time and the distance from the point A to the point B (specific distance).

Figure 14:
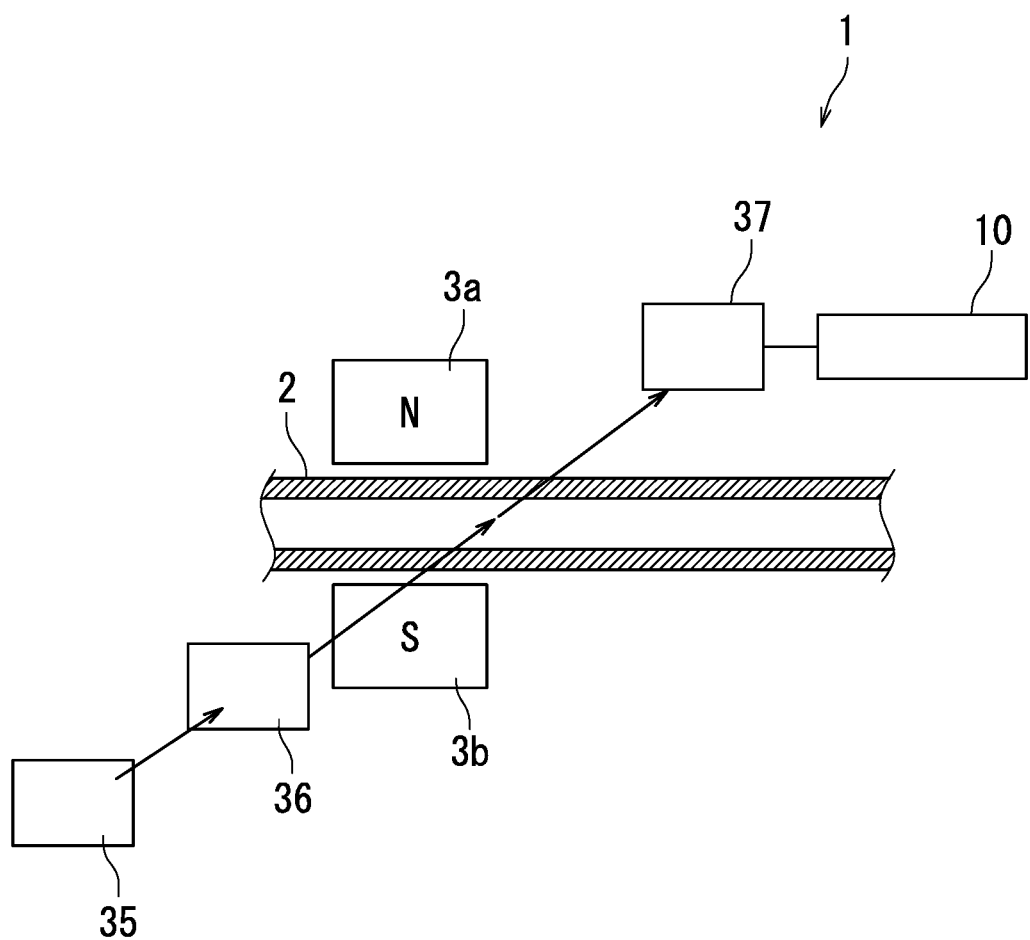
FIG. 14 is a diagram illustrating a configuration for obtaining a scattered light absorption spectrum or emission spectrum in the first embodiment of the present invention.

The following describes a configuration for obtaining a scattered light absorption spectrum or emission spectrum with reference to FIG. 14. FIG. 14 is a diagram illustrating a configuration for obtaining a scattered light absorption spectrum or emission spectrum. As illustrated in FIG. 14, the particle analyzer 1 further includes a second light source 35, a second spectrometer 36, and a sixth optical sensor 37.

A light source that emits light having a wavelength selected from among deep ultraviolet to infrared wavelengths is used as the second light source 35. Light emitted from the second light source 35 is irradiated onto the particles contained in the medium in the measurement cell 2 through the second spectrometer 36 (for example, a grating). In other words, dispersed light is irradiated onto the particles. The sixth optical sensor 37 detects light scattered (scattered light) from the particles irradiated with the light through the second spectrometer 36. The sixth optical sensor 37 can for example include a photo multiplier tube, a photodiode array, or a CCD as a light-detecting element.

From an output of the sixth optical sensor 37, the measurement section 10 obtains a spectrum (an absorption spectrum or an emission spectrum) of the scattered light corresponding to wavelengths (incoming wavelengths) of rays of the dispersed light entering the particles. The scattered light absorption spectrum and emission spectrum have information of a structure of a molecule forming the particles. The measurement section 10 identifies the molecular structure from the scattered light absorption spectrum or emission spectrum.

No particular limitations are placed on a region to be irradiated with the laser light in the molecular structure determination based on the scattered light absorption spectrum or emission spectrum. Preferably, as in the case of the particle size distribution determination based on the spectrophotometric spectral analysis method described with reference to FIG. 1, a region where the particles are not influenced by the magnetic field generated by the magnets 3a and 3b is irradiated with the laser light. Preferably, the scattered light absorption spectrum or emission spectrum is obtained while the power source 5 is not generating a voltage.

It should be noted that the first optical sensor 9 described with reference to FIG. 1 may be used as the sixth optical sensor 37.

Figure 15:
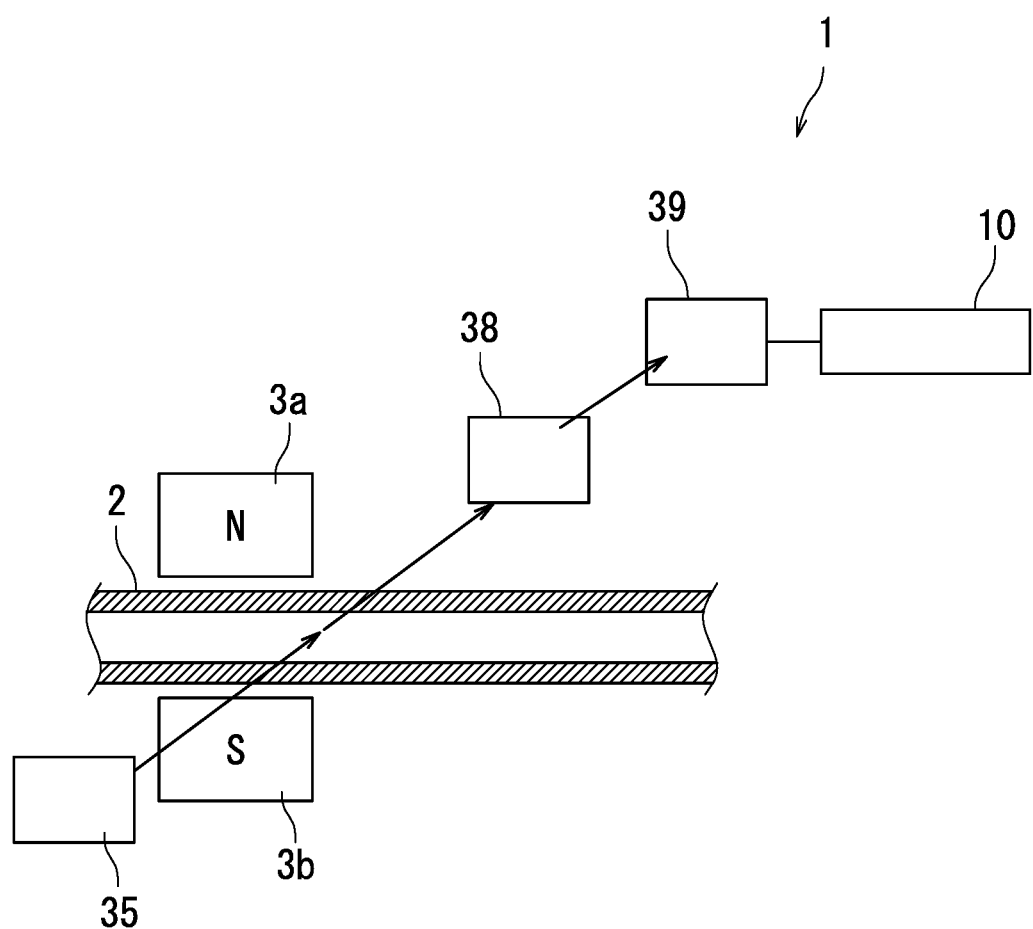
FIG. 15 is a diagram illustrating a configuration for obtaining a scattered light scattering spectrum in the first embodiment of the present invention.

The following describes a configuration for obtaining a scattered light scattering spectrum with reference to FIG. 15. FIG. 15 is a diagram illustrating a configuration for obtaining a scattered light scattering spectrum. As illustrated in FIG. 15, the particle analyzer 1 further includes a third spectrometer 38 and a seventh optical sensor 39.

Light emitted from the second light source 35 is irradiated onto the particles contained in the medium in the measurement cell 2. The seventh optical sensor 39 detects light scattered (scattered light) from the particles irradiated with the light through the third spectrometer 38 (for example, a grating). In other words, scattered light that is dispersed is detected. The seventh optical sensor 39 can for example include a photo multiplier tube, a photodiode array, or a CCD as a light-detecting element.

From an output of the seventh optical sensor 39, the measurement section 10 obtains a scattered light scattering spectrum corresponding to wavelengths (incoming wavelengths) of light entering the particles. The scattered light scattering spectrum has information of a structure of a molecule forming the particles. The measurement section 10 identifies the molecular structure from the scattered light scattering spectrum.

No particular limitations are placed on a region to be irradiated with the laser light in the molecular structure determination based on the scattered light scattering spectrum. Preferably, as in the case of the particle size distribution determination based on the spectrophotometric spectral analysis method described with reference to FIG. 1, a region where the particles are not influenced by the magnetic field generated by the magnets 3a and 3b is irradiated with the laser light. Preferably, the scattered light scattering spectrum is obtained while the power source 5 is not generating a voltage.

It should be noted that the first optical sensor 9 described with reference to FIG. 1 may be used as the seventh optical sensor 39.

Figure 16:
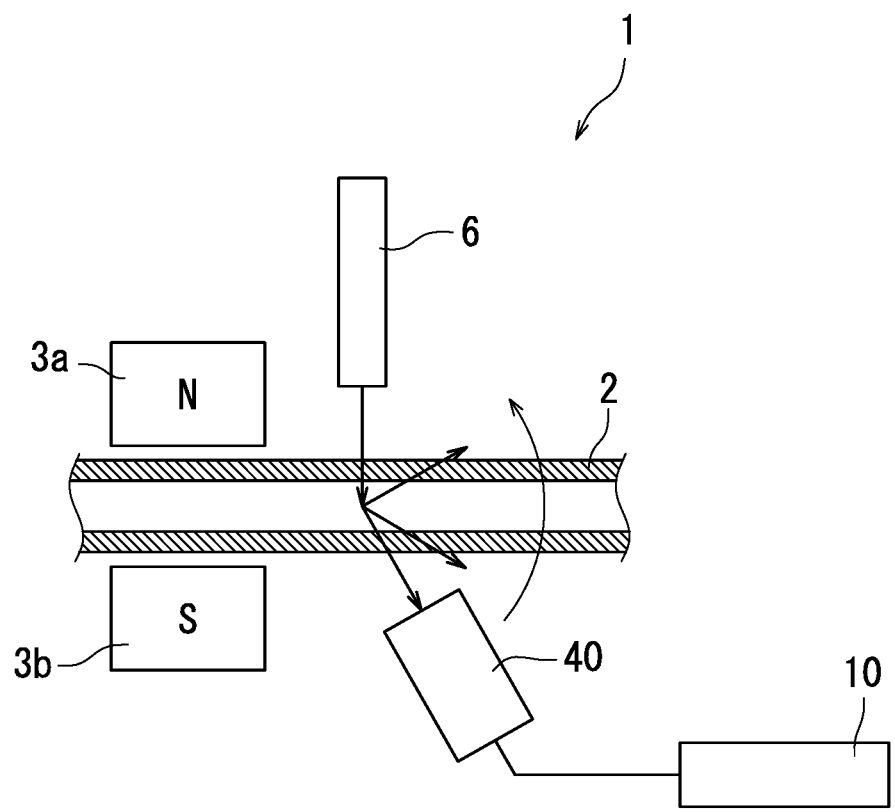
FIG. 16 is a diagram illustrating a configuration for determining a particle size distribution and a molecular weight based on a static light scattering method in the first embodiment of the present invention.

The following describes the static light scattering method with reference to FIG. 16. FIG. 16 is a diagram illustrating a configuration for determining a particle size distribution and a molecular weight based on the static light scattering method. That is, FIG. 16 illustrates the particle analyzer 1 in a state of determining the particle size distribution and the molecular weight of a molecule forming the particles based on the static light scattering method. As illustrated in FIG. 16, the particle analyzer 1 further includes an eighth optical sensor 40.

Laser light is emitted from the laser light source 6 in order to determine the particle size distribution and the molecular weight based on the static light scattering method. The laser light is irradiated onto the particles in the measurement cell 2. The eighth optical sensor 40 detects light scattered (scattered light) from the particles irradiated with the laser light at a plurality of specific points while moving about a central axis of the measurement cell 2. For example, the eighth optical sensor 40 may move along a rail having an arc shape. The eighth optical sensor 40 can for example include a photo multiplier tube, a photodiode array, or a CCD as a light-detecting element. The measurement section 10 determines the particle size distribution and the molecular weight in accordance with the Rayleigh theory from an output of the eighth optical sensor 40 (signals indicative of intensities of rays of the scattered light each having a different scattering angle).

No particular limitations are placed on a region to be irradiated with the laser light in the particle size distribution and molecular weight determination based on the static light scattering method. Preferably, as in the case of the particle size distribution determination based on the spectrophotometric spectral analysis method described with reference to FIG. 1, a region where the particles are not influenced by the magnetic field generated by the magnets 3*a* and 3*b* is irradiated with the laser light. Preferably, the scattered light is detected while the power source 5 is not generating a voltage.

It should be noted that the first optical sensor 9 described with reference to FIG. 1 may be used as the eighth optical sensor 40. Alternatively, a plurality of optical sensors may be used to determine the molecular weight. That is, an optical sensor may be provided for each scattered light detection point (scattering angle).

Through the above, the first embodiment has been described. According to the first embodiment, a plurality of characteristics of particles can be measured using a single system. More specifically, the particle analyzer 1 according to the first embodiment can determine magnetic susceptibility, zeta potential, permittivity, refractive index, surface electrical conductance, particle size, particle size distribution, molecular structure, and molecular weight. Furthermore, the particle analyzer 1 according to the first embodiment can determine migration rate.

Furthermore, according to the first embodiment, it is possible to perform the following using a single laser light source 6: photophoresis; particle size distribution determination based on the Brownian motion observation method, the dynamic light scattering method, the static light scattering method, and the laser diffraction method; migration rate determination based on the scattered light frequency shift analysis method, the heterodyne method, and the point to point traveling time analysis method; and molecular weight determination based on the static light scattering method.

Furthermore, according to the first embodiment, a corrected particle size distribution can be obtained based on a result of determination of particle size distribution in a region where particles are not migrating and a result of determination of particle size distribution in a region where particles are migrating. As a result, the accuracy of particle size distribution determination can be increased, and thus the accuracy of determination of magnetic susceptibility, permittivity, and the like can be increased. For example, particle size distribution determination in a region where the particles are not influenced by a magnetic field is performed and particle size distribution determination in the magnetophoresis region 12 is performed during determination of the magnetic susceptibility of the particles, and a corrected particle size distribution is obtained based on such determination results. As a result, the accuracy of the particle size distribution determination is increased, and thus the accuracy of the magnetic susceptibility determination is increased.

Furthermore, according to the first embodiment, the display section 11 can display a graph showing a relationship between the particle size and the magnetic susceptibility. For example, the display section 11 displays a graph plotting magnetic susceptibility against particle size. This graph shows distribution of magnetic susceptibility against particle size. The distribution of magnetic susceptibility against particle size depends on the crystal structure or the density of measurement target particles. That is, distribution of magnetic susceptibility against particle size is different between particles having a certain crystal structure or density and particles having a different crystal structure or density (for example, between copper phthalocyanine having an a-form crystal structure and copper phthalocyanine having a β-form crystal structure). Therefore, the crystal structure or the density of the particles can be evaluated based on the distribution of magnetic susceptibility against particle size thereof. The density of particles represents a proportion of the volume of the framework (bulk) of the particles to the volume of the particles.

Furthermore, according to the first embodiment, the display section 11 can display a graph showing a relationship between the particle size and the magnetophoretic velocity. For example, the display section 11 displays a graph plotting magnetophoretic velocity against particle size. This graph shows distribution of magnetophoretic velocity against particle size. The distribution of magnetophoretic velocity against particle size also depends on the crystal structure or the density of measurement target particles. That is, distribution of magnetophoretic velocity against particle size is different between particles having a certain crystal structure or density and particles having a different crystal structure or density. Therefore, the crystal structure or the density of the particles can be evaluated based on the distribution of magnetophoretic velocity against particle size thereof.

Furthermore, according to the first embodiment, the display section 11 can display a graph showing a relationship between the square value of the radius of the particles and the magnetophoretic velocity. For example, the display section 11 displays a graph plotting magnetophoretic velocity against square value of the radius of the particles. This graph shows distribution of magnetophoretic velocity against square value of the radius of the particles. The distribution of magnetophoretic velocity against square value of the radius of the particles depends on the shape of the particles. More specifically, the more spherical the particles are, the smaller variation in distribution is. In a case where the measurement target is particles that are not uniformly spherical such as a ground toner, variation in distribution is wider. Therefore, the shape of the particles can be evaluated based on the distribution of magnetophoretic velocity against square value of the radius of the particles.

A direction of incidence of the laser light on the measurement cell 2 can be a direction along a longitudinal direction of the measurement cell 2. In other words, the laser light can be input into the measurement cell 2 from a longitudinal end surface of the measurement cell 2. For example, the laser light can be input into the measurement cell 2 from a surface of one end of the measurement cell 2 by attaching a transparent electrode to the one end. As a result of the laser light being input in the direction along the longitudinal direction of the measurement cell 2, for example photophoresis of the particles along the longitudinal direction of the measurement cell 2 can be caused.

In order to match a traveling direction of the laser light with the longitudinal direction of the measurement cell 2 in a configuration in which the laser light is input from the end surface of the measurement cell 2, the angle of the laser light source 6 needs to be adjusted to a high degree of accuracy. Therefore, the laser light mostly zigzags while being reflected off side walls of the measurement cell 2. However, a portion of the laser light may pass through a side wall of the measurement cell 2 depending on the angle of incidence of the laser light on the side wall of the measurement cell 2. As a result, the amount and power of the laser light irradiated onto the particles may be reduced. Furthermore, the laser light that has passed through the side wall of the measurement cell 2 may enter the first optical sensor 9, the imaging section 18, or the like as noise. In order to avoid such inconveniences, the particle analyzer 1 may include an exterior 41 that covers an outer circumferential surface of the measurement cell 2 as illustrated in FIG. 17.

Figure 17:
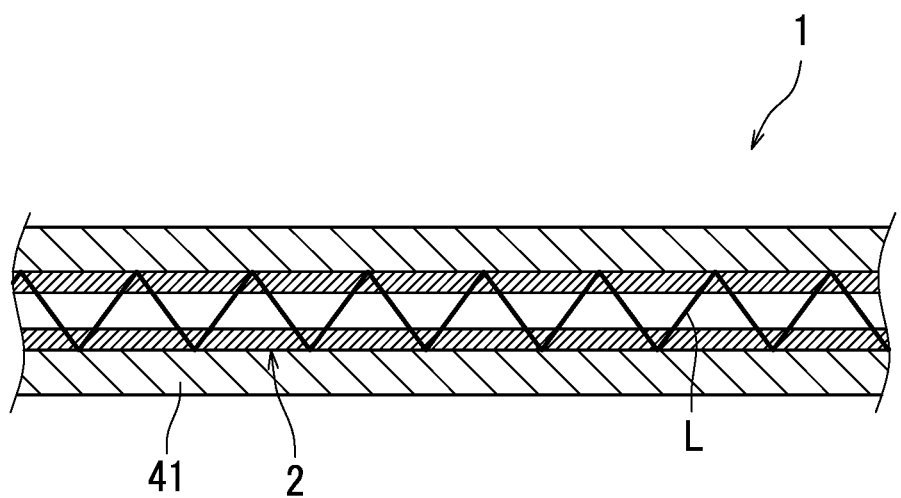
FIG. 17 is a diagram illustrating another example of the particle analyzer according to the first embodiment of the present invention.

FIG. 17 is a diagram illustrating another example of the particle analyzer 1. As illustrated in FIG. 17, the particle analyzer 1 further includes the exterior 41 that covers the outer circumferential surface of the measurement cell 2. The exterior 41 includes a substance having a smaller refractive index than the measurement cell 2. For example, the exterior 41 may include a liquid having a smaller refractive index than the measurement cell 2.

In a situation in which an angle of incidence of laser light L on a side wall of the measurement cell 2 in the particle analyzer 1 illustrated in FIG. 17 is equal to or greater than a critical angle, the entirety of the laser light is reflected. Accordingly, the laser light L is unlikely to pass through the side wall of the measurement cell 2. As a result of the entirety of the laser light L being reflected off the side wall of the measurement cell 2, the laser light L in an amount and power necessary for particle analysis can be irradiated onto the particles in all the regions of the measurement cell 2.

The present embodiment has been described using, as an example, a configuration in which the magnets 3a and 3b are permanent magnets. However, the magnets 3a and 3b may be electromagnets or superconducting magnets. In a configuration in which the magnets 3a and 3b are electromagnets or superconducting magnets, the accuracy of particle size distribution determination is increased by turning off the magnetic field, when the particle size distribution determination is performed based on, for example, the spectrophotometric spectral analysis method for the scattered light detection region set to a region near the end of the magnet 3a and the end of the magnet 3b (in other words, the magnetophoresis region 12 described with reference to FIG. 3).

The present embodiment has been described using, as an example, a configuration in which one set of magnets 3a and 3b is used. However, no particular limitations are placed on the number of sets of north and south magnets. More specifically, a plurality of north magnets are disposed side by side, and a plurality of south magnets are disposed opposite to the respective north magnets.

The present embodiment has been described using, as an example, a configuration in which particles are caused to migrate by the magnetophoresis method, the electrophoresis method, the dielectrophoresis method, the electromagnetophoresis method, and the photophoresis method. However, the particle analyzer 1 may have a configuration adopting a combination of some of the magnetophoresis method, the electrophoresis method, the dielectrophoresis method, the electromagnetophoresis method, and the photophoresis method. For example, the particle analyzer 1 may have a configuration in which particles are caused to migrate by the electrophoresis method and the photophoresis method, a configuration in which particles are caused to migrate by the magnetophoresis method and the dielectrophoresis method, or a configuration in which particles are caused to migrate by the magnetophoresis method, the electrophoresis method, and the photophoresis method.

Similarly, the present embodiment has been described using, as an example, a configuration in which the particle size and the particle size distribution are determined by the imaging method, the Brownian motion observation method, the spectrophotometric spectral analysis method, the dynamic light scattering method, the static light scattering method, and the laser diffraction method. However, the particle analyzer 1 may have a configuration adopting one of the imaging method, the Brownian motion observation method, the spectrophotometric spectral analysis method, the dynamic light scattering method, the static light scattering method, and the laser diffraction method or a configuration adopting some of the aforementioned methods.

The present embodiment has been described using, as an example, a configuration in which the moving rate (migration rate) of particles is determined based on the particle tracking method, the scattered light frequency shift analysis method, the heterodyne method, and the point to point traveling time analysis method. However, the particle analyzer 1 may have a configuration adopting one of the particle tracking method, the scattered light frequency shift analysis method, the heterodyne method, and the point to point traveling time analysis method or a configuration adopting a combination of some of the aforementioned methods.

The present embodiment has been described for the particle analyzer 1 including both a configuration for obtaining a scattering spectrum and a configuration for obtaining an absorption spectrum or an emission spectrum. However, the particle analyzer 1 may have either a configuration for obtaining a scattering spectrum or a configuration for obtaining an absorption spectrum or an emission spectrum.

The present embodiment has been described for the particle analyzer 1 having a configuration for identifying the molecular structure. However, the configuration for identifying the molecular structure may be omitted. Similarly, the present embodiment has been described for the particle analyzer 1 having a configuration for determining the molecular weight. However, the configuration for identifying the molecular weight may be omitted.

In the present embodiment, the particle size distribution and the molecular weight are determined based on the static light scattering method. However, one of the particle size distribution and the molecular weight may be determined based on the static light scattering method.

Second Embodiment

The following describes a particle analyzer 1 according to a second embodiment with reference to the drawings. However, the following describes differences compared to the first embodiment and omits description of matter shared with the first embodiment. The second embodiment is different from the first embodiment in that the particle analyzer 1 is capable of causing particles to migrate by the gravitational sedimentation method in addition to the magnetophoresis method, the electrophoresis method, the dielectrophoresis method, the electromagnetophoresis method, and the photophoresis method.

Figure 18:
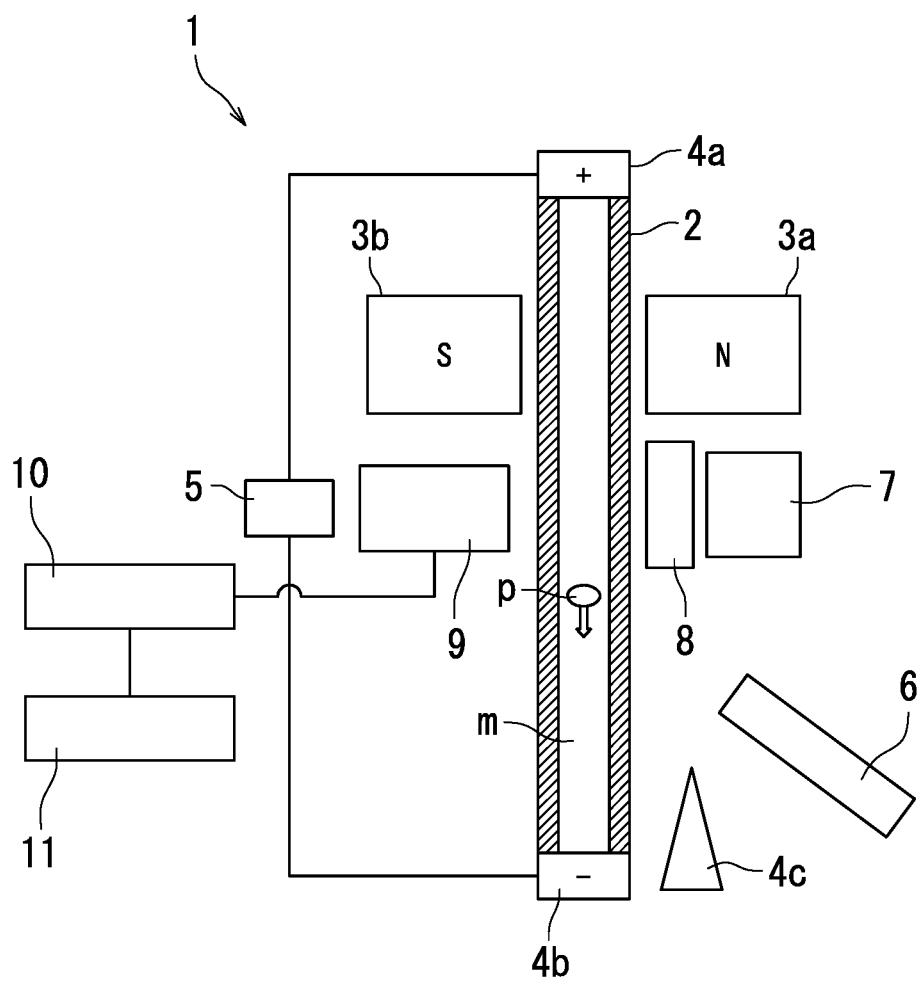
FIG. 18 is a diagram illustrating a partial configuration of a particle analyzer according to a second embodiment of the present invention.

FIG. 18 is a diagram illustrating a partial configuration of the particle analyzer 1 according to the second embodiment. The particle analyzer 1 according to the second embodiment is different from the particle analyzer 1 according to the first embodiment in that the measurement cell 2 is disposed along a vertical direction.

As illustrated in FIG. 18, the measurement cell 2 disposed along the vertical direction enables determination of the specific gravity of particles based on the gravitational sedimentation method. That is, in a situation in which particles p have a greater specific gravity than a medium m, the particles p precipitate, under force resulting from a gravitational field, at a rate depending on their specific gravity. The measurement section 10 determines the specific gravity of the particles p based on the moving rate of the precipitating particles p. The measurement section 10 also determines the mass of the particles p. More specifically, the measurement section 10 calculates the volume of the particles p using the particle size of the particles p. The measurement section 10 then calculates the mass of the particles p using the specific gravity and the volume of the particles p. The measurement section 10 causes the display section 11 to display the specific gravity and the mass of the particles p. In a case where the volume of the particles p is preset in the measurement section 10, the mass of the particles p may be calculated using the preset volume of the particles p.

Through the above, the second embodiment has been described. According to the second embodiment, the specific gravity and the mass of the particles p can be determined.

Third Embodiment

The following describes a particle analyzer 1 according to a third embodiment with reference to the drawings. However, the following describes differences compared to the first and second embodiments and omits description of matter shared with the first and second embodiments. The third embodiment is different from the first and second embodiments in that the particle analyzer 1 includes a mechanism for introducing a medium into the measurement cell 2.

Figure 19:
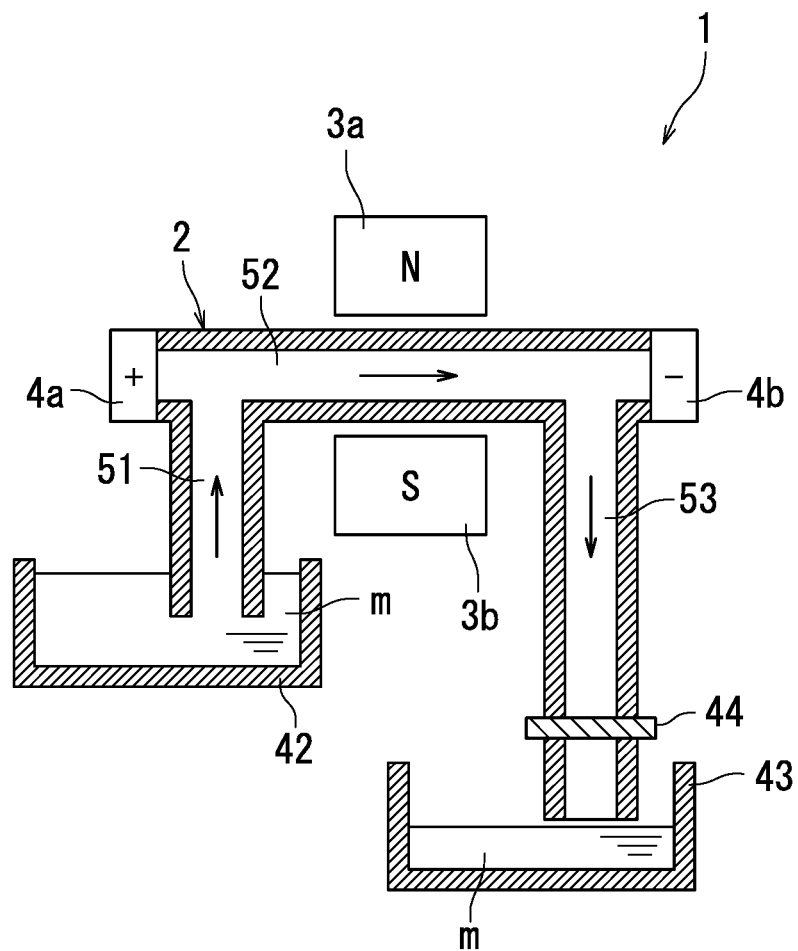
FIG. 19 is a diagram illustrating a partial configuration of a particle analyzer according to a third embodiment of the present invention.

FIG. 19 is a diagram illustrating a partial configuration of the particle analyzer 1 according to the third embodiment. The particle analyzer 1 according to the third embodiment introduces the medium into the measurement cell 2 in accordance with the siphon principle. More specifically, particle analyzer 1 includes a supply section 42, a collection section 43, and a valve 44. The measurement cell 2 includes an introduction section 51, a main body section 52, and a discharge section 53.

The introduction section 51, the main body section 52, and the discharge section 53 are linked together in the stated order. More specifically, the introduction section 51 is linked to one longitudinal end of the main body section 52, and the discharge section 53 is linked to the other longitudinal end of the main body section 52. The introduction section 51 and the discharge section 53 extend downward. The discharge section 53 is longer than the introduction section 51. In other words, an outlet in the discharge section 53 is located below an inlet in the introduction section 51.

The supply section 42 is located under the introduction section 51. The collection section 43 is located under the discharge section 53. The valve 44 is provided in the discharge section 53. The valve 44 is located below the inlet in the introduction section 51.

For causing the medium m containing the particles to flow into the main body section 52 of the measurement cell 2, the medium m containing the particles is supplied to the supply section 42 with the valve 44 closed. Thereafter, the valve 44 is opened, and thus the medium m flows from the supply section 42 into the measurement cell 2 in accordance with the siphon principle. The medium m then flows in the measurement cell 2 through the introduction section 51, the main body section 52, and the discharge section 53 in the stated order and is collected in the collection section 43. As a result, together with the medium m, the particles contained in the medium m flow through the introduction section 51, the main body section 52, and the discharge section 53 in the stated order.

Through the above, the third embodiment has been described. According to the third embodiment, the medium m containing the particles can be introduced into the measurement cell 2 in accordance with the siphon principle without using a pump. Accordingly, the flow rate of the medium m flowing in the measurement cell 2 is more stable and the accuracy of the particle analysis is higher than in a configuration in which a pump is used. In a configuration in which a pump is used, the flow rate of the medium m flowing in the measurement cell 2 varies due to pump pulsation. The varying flow rate of the medium m can for example be a factor of a reduction in the accuracy of the migration rate determination.

Through the above, embodiments of the present invention have been described with reference to the drawings. However, the present invention is not limited to the embodiments described above and may be implemented in various different forms within the scope not departing from the gist of the present disclosure.

For example, the shape of the electrode for generating an inhomogeneous electric field is not limited to a needle shape although the embodiments of the present invention have been described for a configuration in which the needle-shaped electrode 4c is used for generating an inhomogeneous electric field. For example, a rod electrode may be used for generating an inhomogeneous electric field.

For another example, the particle size distribution may be determined using ultrasound, although light such as laser light is used for the particle size distribution determination according to the embodiments of the present invention. That is, the particle size distribution may be determined by an ultrasound method. According to the ultrasound method, ultrasound is applied to a medium containing particles dispersed therein to determine attenuation characteristics of the ultrasound. Next, the particle size distribution is determined from the attenuation characteristics. For example, the ultrasound that reaches a receiving sensor attenuates as a result of the particles reflecting or scattering the ultrasound. No particular limitations are placed on a region to which the ultrasound is applied. Preferably, the ultrasound is applied to a region where the particles are not influenced by force resulting from the external field.

The migration rate of the particles may be determined through analysis of frequency shift of the ultrasound. More specifically, the attenuation rate of the ultrasound depends on the frequency of the ultrasound. The frequency of the ultrasound reflected or scattered by the migrating particles shifts depending on the migration rate of the particles. Thus, the attenuation characteristics of the ultrasound give indication of the migration rate of the particles. Accordingly, the migration rate of the particles can be determined through analysis of the attenuation characteristics of the ultrasound. Alternatively, the migration rate of the particles may be determined through analysis of energy intensity fluctuations of the ultrasound received by the receiving sensor.

INDUSTRIAL APPLICABILITY

The present invention is usefully applicable to devices for analyzing particles.

REFERENCE SIGNS LIST

1 Particle analyzer
2 Measurement cell
3a, 3b Magnet
4a, 4b Plate electrode
4c Needle-shaped electrode
5 Power source
6 Laser light source
10 Measurement section
11 Display section

The invention claimed is:

1. A particle analyzer comprising:
   a measurement cell configured to receive loading of a medium containing particles;
   a migration section configured to cause migration of the particles in the medium in the measurement cell;
   a measurement section configured to determine a physical quantity of the particles in the medium in the measurement cell and determine a moving rate of the particles during the migration caused by the migration section;
   a laser light source configured to irradiate the particles in the medium in the measurement cell with laser light;
   a reference light generator configured to generate reference light as a portion of the laser light by splitting the laser light before the laser light enters the measurement cell; and
   an optical sensor configured to receive the reference light and light scattered from the particles irradiated with the laser light, wherein
   the migration section causes the migration of the particles by at least two of a magnetophoresis method, a dielectrophoresis method, an electromagnetophoresis method, a photophoresis method, and a gravitational sedimentation method,
   the measurement section determines the moving rate of the particles and determines a particle size distribution of the particles as a physical quantity of the particles, based on an output of the optical sensor, and
   the measurement section performs, as the determination of a physical quantity of the particles, at least two of:
   determination of a magnetic susceptibility of the particles based on the particle size distribution and the moving rate of the particles during the migration by the magnetophoresis method;
   determination of a permittivity of the particles based on the particle size distribution and the moving rate of the particles during the migration by the dielectrophoresis method;
   determination of an electrical conductivity of the particles based on the particle size distribution and the moving rate of the particles during the migration by the electromagnetophoresis method;
   determination of a refractive index of the particles based on the particle size distribution and the moving rate of the particles during the migration by the photophoresis method; and
   determination of a specific gravity or a mass of the particles based on the moving rate of the particles during the migration by the gravitational sedimentation method.

2. The particle analyzer according to claim 1, wherein the measurement section further performs, as the determination of a physical quantity of the particles, determination of a molecular weight of the particles based on a static light scattering method.

3. The particle analyzer according to claim 1, further comprising:
   a light source configured to generate light to be irradiated onto the particles in the medium in the measurement cell, wherein
   the optical sensor detects light from the particles irradiated with the light, and
   the measurement section obtains at least one of an absorption spectrum, an emission spectrum, and a scattering spectrum corresponding to wavelengths of the light irradiated onto the particles based on an output of the optical sensor.

4. The particle analyzer according to claim 1, further comprising
   a display section configured to display a screen image showing at least one physical quantity determined by the measurement section or a screen image showing a relationship between at least two physical quantities determined by the measurement section.

5. The particle analyzer according to claim 4, further comprising
   an imaging section configured to image the particles, wherein
   the display section displays a screen image including the particles imaged by the imaging section.

6. The particle analyzer according to claim 5, wherein
   the display section displays a screen image including the imaged particles and a screen image that shows at least one physical quantity determined by the measurement section and that is superimposed on the imaged particles.

7. The particle analyzer according to claim 5, wherein
   the display section displays a screen image including the imaged particles in which imaged particles having a specific physical quantity that is equal to or greater than a threshold value are shown in a color, and imaged particles having the specific physical quantity that is smaller than the threshold value are shown in a different color.

8. The particle analyzer according to claim 1, further comprising
   an exterior that covers the measurement cell, wherein
   the exterior includes a substance having a smaller refractive index than the measurement cell.

9. A particle analyzer comprising:
   a measurement cell configured to receive loading of a medium containing particles;
   a migration section configured to cause migration of the particles in the medium in the measurement cell;
   a measurement section configured to determine a physical quantity of the particles in the medium in the measurement cell and determine a moving rate of the particles during the migration caused by the migration section;
   a laser light source configured to irradiate the particles in the medium in the measurement cell with laser light;
   a reference light generator configured to generate reference light as a portion of the laser light by splitting the laser light before the laser light enters the measurement cell; and
   an optical sensor configured to receive the reference light and light scattered from the particles irradiated with the laser light, wherein the migration section causes the migration of the particles by at least two of a dielectrophoresis method, an electromagnetophoresis method, a photophoresis method, a gravitational sedimentation method, and an electrophoresis method, the measurement section determines the moving rate of the particles and determines a particle size distribution of the particles as a physical quantity of the particles, based on an output of the optical sensor, and the measurement section performs, as the determination of a physical quantity of the particles, at least two of:

determination of a permittivity of the particles based on the particle size distribution and the moving rate of the particles during the migration by the dielectrophoresis method;

determination of an electrical conductivity of the particles based on the particle size distribution and the moving rate of the particles during the migration by the electromagnetophoresis method;

determination of a refractive index of the particles based on the particle size distribution and the moving rate of the particles during the migration by the photophoresis method;

determination of a specific gravity or a mass of the particles based on the moving rate of the particles during the migration by the gravitational sedimentation method; and determination of a zeta potential of the particles based on the moving rate of the particles during the migration by the electrophoresis method.

10. The particle analyzer according to claim 9, wherein the measurement section further performs, as the determination of a physical quantity of the particles, determination of a molecular weight of the particles based on a static light scattering method.

11. The particle analyzer according to claim 9, further comprising:
a light source configured to generate light to be irradiated onto the particles in the medium in the measurement cell, wherein
the optical sensor detects light from the particles irradiated with the light, and
the measurement section obtains at least one of an absorption spectrum, an emission spectrum, and a scattering spectrum corresponding to wavelengths of the light irradiated onto the particles based on an output of the optical sensor.

12. The particle analyzer according to claim 9, further comprising
a display section configured to display a screen image showing at least one physical quantity determined by the measurement section or a screen image showing a relationship between at least two physical quantities determined by the measurement section.

13. The particle analyzer according to claim 12, further comprising
an imaging section configured to image the particles, wherein
the display section displays a screen image including the particles imaged by the imaging section.

14. The particle analyzer according to claim 13, wherein the display section displays a screen image including the imaged particles and a screen image that shows at least one physical quantity determined by the measurement section and that is superimposed on the imaged particles.

15. The particle analyzer according to claim 13, wherein the display section displays a screen image including the imaged particles in which imaged particles having a specific physical quantity that is equal to or greater than a threshold value are shown in a color, and imaged particles having the specific physical quantity that is smaller than the threshold value are shown in a different color.

16. The particle analyzer according to claim 9, further comprising
an exterior that covers the measurement cell, wherein
the exterior includes a substance having a smaller refractive index than the measurement cell.

17. A particle analyzer comprising:
a measurement cell configured to receive loading of a medium containing particles;
a migration section configured to cause migration of the particles in the medium in the measurement cell;
a measurement section configured to determine a physical quantity of the particles in the medium in the measurement cell and determine a moving rate of the particles during the migration caused by the migration section;
a laser light source configured to irradiate the particles in the medium in the measurement cell with laser light;
a reference light generator configured to generate reference light as a portion of the laser light by splitting the laser light before the laser light enters the measurement cell; and
an optical sensor configured to receive the reference light and light scattered from the particles irradiated with the laser light, wherein the migration section causes the migration of the particles by a magnetophoresis method, an electrophoresis method, and at least one of a dielectrophoresis method, an electromagnetophoresis method, a photophoresis method, and a gravitational sedimentation method, the measurement section determines the moving rate of the particles and determines a particle size distribution of the particles as a physical quantity of the particles, based on an output of the optical sensor, and the measurement section performs, as the determination of a physical quantity of the particles:

determination of a magnetic susceptibility of the particles based on the particle size distribution and the moving rate of the particles during the migration by the magnetophoresis method, determination of a zeta potential of the particles based on the moving rate of the particles during the migration by the electrophoresis method, and at least one of:

determination of a permittivity of the particles based on the particle size distribution and the moving rate of the particles during the migration by the dielectrophoresis method;

determination of an electrical conductivity of the particles based on the particle size distribution and the moving rate of the particles during the migration by the electromagnetophoresis method;

determination of a refractive index of the particles based on the particle size distribution and the moving rate of the particles during the migration by the photophoresis method; and determination of a specific gravity or a mass of the particles based on the moving rate of the particles during the migration by the gravitational sedimentation method.

18. The particle analyzer according to claim 17, wherein the measurement section further performs, as the determination of a physical quantity of the particles, determination of a molecular weight of the particles based on a static light scattering method.

19. The particle analyzer according to claim 17, further comprising:
   a light source configured to generate light to be irradiated onto the particles in the medium in the measurement cell, wherein
   the optical sensor detects light from the particles irradiated with the light, and
   the measurement section obtains at least one of an absorption spectrum, an emission spectrum, and a scattering spectrum corresponding to wavelengths of the light irradiated onto the particles based on an output of the optical sensor.

20. The particle analyzer according to claim 17, further comprising
   a display section configured to display a screen image showing at least one physical quantity determined by the measurement section or a screen image showing a relationship between at least two physical quantities determined by the measurement section.

21. The particle analyzer according to claim 20, further comprising
   an imaging section configured to image the particles, wherein
   the display section displays a screen image including the particles imaged by the imaging section.

22. The particle analyzer according to claim 21, wherein the display section displays a screen image including the imaged particles and a screen image that shows at least one physical quantity determined by the measurement section and that is superimposed on the imaged particles.

23. The particle analyzer according to claim 21, wherein the display section displays a screen image including the imaged particles in which imaged particles having a specific physical quantity that is equal to or greater than a threshold value are shown in a color, and imaged particles having the specific physical quantity that is smaller than the threshold value are shown in a different color.

24. The particle analyzer according to claim 17, further comprising an exterior that covers the measurement cell, wherein
   the exterior includes a substance having a smaller refractive index than the measurement cell.

* * * * *